(12) United States Patent
Venkatesan et al.

(10) Patent No.: US 12,401,630 B2
(45) Date of Patent: Aug. 26, 2025

(54) ZERO-TRUST DISTRIBUTED DATA SHARING

(71) Applicant: Microsoft Technology Licensing, LLC, Redmond, WA (US)

(72) Inventors: Ramarathnam Venkatesan, Redmond, WA (US); Michael James Zwilling, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 112 days.

(21) Appl. No.: 17/937,098

(22) Filed: Sep. 30, 2022

(65) Prior Publication Data

US 2024/0114012 A1 Apr. 4, 2024

(51) Int. Cl.
*H04L 9/00* (2022.01)
*H04L 9/40* (2022.01)

(52) U.S. Cl.
CPC ........ *H04L 63/0435* (2013.01); *H04L 63/105* (2013.01); *H04L 63/107* (2013.01)

(58) Field of Classification Search
CPC . H04L 63/0435; H04L 63/105; H04L 63/107; H04L 9/3218; H04L 9/50; G06F 21/62; G06F 21/31; G06F 2221/2103; G06F 2221/2111; G06F 21/64
See application file for complete search history.

(56) References Cited

U.S. PATENT DOCUMENTS

| | | | |
|---|---|---|---|
| 8,601,549 B2 | 12/2013 | Dickerson |
| 9,547,771 B2 | 1/2017 | Roth |
| 10,211,977 B1 | 2/2019 | Roth |
| 10,637,855 B2 | 4/2020 | Mikulski |
| 10,990,689 B1 | 4/2021 | Reiner |
| 11,036,869 B2 | 6/2021 | Roth |
| 11,139,954 B2 | 10/2021 | Mercuri |
| 11,424,920 B2 | 8/2022 | Bursell |
| 11,544,409 B2 | 1/2023 | Brannon |
| 11,593,316 B2 | 2/2023 | Haldar |
| 11,695,555 B2 | 7/2023 | Roth |

(Continued)

FOREIGN PATENT DOCUMENTS

| | | |
|---|---|---|
| CN | 110363528 A | 10/2019 |
| CN | 114221764 A | 3/2022 |
| JP | 2022020557 A | 2/2022 |

OTHER PUBLICATIONS

A Blockchain-based Approach for Data Sharing (Year: 2020).*

(Continued)

*Primary Examiner* — Syed M Ahsan
(74) *Attorney, Agent, or Firm* — Weaver IP L.L.C.

(57) ABSTRACT

A decryption key is recovered that is utilized to decrypt an encrypted resource. For example, a determination is made as to whether a user and/or the user's computing device attempting to access an encrypted resource has the necessary attributes to access the resource and/or is in a valid location (Continued)

in which the user is required to be to access the resource. The attributes and/or location are defined by a policy assigned to the resource. To verify that the user has the required attributes, a proof is requested from the user that proves that the user has the required attributes. Upon validating the proof, the decryption key is generated and/or retrieved.

20 Claims, 11 Drawing Sheets

(56) References Cited

U.S. PATENT DOCUMENTS

| | | | |
|---|---|---|---|
| 11,799,630 | B2 | 10/2023 | Zhang |
| 11,886,574 | B2 | 1/2024 | Bursell |
| 12,058,265 | B2 | 8/2024 | Khoury |
| 12,107,900 | B2 | 10/2024 | Gargaro |
| 2002/0023213 | A1 | 2/2002 | Walker |
| 2002/0138738 | A1 | 9/2002 | Sames |
| 2007/0055867 | A1 | 3/2007 | Kanungo et al. |
| 2012/0060207 | A1 | 3/2012 | Mardikar et al. |
| 2013/0145151 | A1 | 6/2013 | Brown |
| 2015/0089575 | A1 | 3/2015 | Vepa |
| 2015/0288669 | A1 | 10/2015 | Litoiu |
| 2015/0381575 | A1 | 12/2015 | Bhargav-Spantzel et al. |
| 2017/0041148 | A1 | 2/2017 | Pearce |
| 2017/0111175 | A1 | 4/2017 | Oberhauser et al. |
| 2019/0020485 | A1 | 1/2019 | Uhr |
| 2019/0163912 | A1 | 5/2019 | Kumar |
| 2019/0258811 | A1 | 8/2019 | Ferraiolo |
| 2019/0370358 | A1 | 12/2019 | Nation |
| 2019/0394175 | A1 | 12/2019 | Zhang |
| 2020/0014537 | A1 | 1/2020 | Ortiz |
| 2020/0082401 | A1 | 3/2020 | Arora |
| 2020/0322342 | A1 | 10/2020 | Gokhale |
| 2020/0374105 | A1 | 11/2020 | Padmanabhan |
| 2020/0396222 | A1 | 12/2020 | Gargaro et al. |
| 2020/0404023 | A1 | 12/2020 | Zhu |
| 2021/0089676 | A1 | 3/2021 | Ford |
| 2021/0092607 | A1 | 3/2021 | Klinkner |
| 2021/0218742 | A1 | 7/2021 | Cook |
| 2021/0232707 | A1 | 7/2021 | Wilson |
| 2021/0233673 | A1 | 7/2021 | Zhang |
| 2021/0273931 | A1 | 9/2021 | Murdoch et al. |
| 2021/0279355 | A1 | 9/2021 | Otte |
| 2021/0303714 | A1 | 9/2021 | Yaghoobi |
| 2021/0367778 | A1 | 11/2021 | Hamel |
| 2021/0377037 | A1 | 12/2021 | Antonopoulos et al. |
| 2022/0020003 | A1 | 1/2022 | Sarkar |
| 2022/0021711 | A1 | 1/2022 | Marsh |
| 2022/0138181 | A1 | 5/2022 | Irazabal |
| 2022/0188810 | A1 | 6/2022 | Doney |
| 2022/0269927 | A1 | 8/2022 | Rice |
| 2022/0271936 | A1 | 8/2022 | Doney |
| 2022/0292211 | A1 | 9/2022 | Reineke |
| 2022/0400020 | A1 | 12/2022 | Davies |
| 2022/0417254 | A1* | 12/2022 | Michaelis ............... H04L 45/02 |
| 2023/0015569 | A1 | 1/2023 | Davies |
| 2023/0035317 | A1 | 2/2023 | Jufer |
| 2023/0336547 | A1 | 10/2023 | Damour |
| 2023/0379699 | A1 | 11/2023 | Oerton |
| 2023/0388348 | A1 | 11/2023 | Authement |
| 2024/0056424 | A1 | 2/2024 | Venkatesan |
| 2024/0089098 | A1 | 3/2024 | Venkatesan |
| 2024/0104229 | A1 | 3/2024 | Venkatesan |
| 2024/0119168 | A1 | 4/2024 | Venkatesan |
| 2024/0121081 | A1 | 4/2024 | Venkatesan |

OTHER PUBLICATIONS

Non-Final Office Action mailed on Jul. 2, 2024, in U.S. Appl. No. 17/819,030, 7 pages.

Antonopoulos, et al., "SQL Ledger: Cryptographically Verifiable Data in Azure SQL Database", In Proceedings of the International Conference on Management of Data, Jun. 20, 2021, pp. 2437-2449.
"International Search Report and Written Opinion Issued in PCT Application No. PCT/US23/027303", Mailed Date: Oct. 13, 2023, 12 Pages.
Yue, et al., "GlassDB: An Efficient Verifiable Ledger Database System Through Transparency", In repository of arXiv:2207.00944v2, Aug. 8, 2022, 14 Pages.
"Application as Filed in U.S. Appl. No. 17/819,030", filed Aug. 11, 2022, 57 Pages.
Alansari., "A Blockchain-Based Approach for Secure, Transparent and Accountable Personal Data Sharing", A thesis submitted in partial fulfillment for the degree of Doctor of Philosophy, Aug. 2, 2020, 213 pages.
International Search Report and Written Opinion received for PCT Application No. PCT/US2023/031022, mailed on Dec. 11, 2023, 16 pages.
Mounnan, et al., "Efficient Distributed Access Control Using Blockchain for Big Data in Clouds", International Conference on Wireless and Mobile Communications (ICWMC), Jun. 30, 2019, pp. 53-62.
"International Search Report and Written Opinion Issued in PCT Application No. PCT/US23/030412", Mailed Date: Oct. 18, 2023, 12 Pages.
Singh, et al., "Security for Online Transaction Based on User Location", In Journal of International Journal For Innovative Research in Multidisciplinary Field, vol. 3, Issue 4, Apr. 1, 2017, pp. 60-64.
International Search Report and Written Opinion received for PCT Application No. PCT/US23/031471, Nov. 14, 2023, 18 pages.
Jaroucheh, et al., "Secretation: Toward a Decentralised Identity and Verifiable Credentials Based Scalable and Decentralised Secret Management Solution", IEEE International Conference on Blockchain and Cryptocurrency, 20201, 09 Pages.
U.S. Appl. No. 17/934,730, filed Sep. 23, 2022.
U.S. Appl. No. 18/045,335, filed Oct. 10, 2022.
U.S. Appl. No. 17/931,733, filed Sep. 13, 2022.
U.S. Appl. No. 17/938,711, filed Oct. 7, 2022.
U.S. Appl. No. 17/819,030, filed Aug. 11, 2022.
International Search Report and Written Opinion received for PCT Application No. PCT/US23/030988, mailed on Nov. 30, 2023, 13 pages.
Non-Final Office Action mailed on Oct. 18, 2024, in U.S. Appl. No. 17/934,730, 25 pages.
Notice of Allowance mailed on Jan. 15, 2025, in U.S. Appl. No. 17/819,030, 5 pages.
Non-Final Office Action mailed on Oct. 9, 2024, in U.S. Appl. No. 17/931,733, 7 pages.
Non-Final Office Action mailed on Oct. 9, 2024, in U.S. Appl. No. 18/045,335, 13 pages.
Notice of Allowance mailed on Sep. 27, 2024, in U.S. Appl. No. 17/819,030, 5 pages.
Notice of Allowance mailed on Feb. 26, 2025, in U.S. Appl. No. 17/931,733, 7 pages.
International Preliminary Report on Patentability received for PCT Application No. PCT/US23/030412, Mar. 27, 2025, 8 Pages.
Final Office Action mailed on Apr. 16, 2025, in U.S. Appl. No. 18/045,335 6 Pages.
Final Office Action mailed on Apr. 24, 2025, in U.S. Appl. No. 17/934,730, 27 pages.
International Preliminary Report on Patentability received for PCT Application No. PCT/US23/030988, Apr. 3, 2025, 8 pages.
International Preliminary Report on Patentability received for PCT Application No. PCT/US23/031022, mailed on Apr. 10, 2025, 9 pages.
International Preliminary Report on Patentability received for PCT Application No. PCT/US23/031471, mailed on Apr. 24, 2025, 14 pages.
Notice of Allowance mailed on Jun. 10, 2025, in U.S. Appl. No. 17/931,733, 5 pages.
Notice of Allowance mailed on May 29, 2025, in U.S. Appl. No. 17/819,030, 6 pages.

* cited by examiner

ZERO-TRUST DISTRIBUTED DATA SHARING

BACKGROUND

Public-key cryptography (also known as asymmetric cryptography) is a cryptographic system that uses pairs of keys. Each pair consists of a public key (which is known to others) and a private key (which is only known to the owner). Effective security requires keeping the private key private, whereas the public key can be openly distributed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In aspects disclosed herein, a decryption key is recovered to decrypt an encrypted resource via zero-trust distributed data sharing. For example, a determination is made as to whether a user and/or the user's computing device attempting to access an encrypted resource has the necessary attributes to access the resource and/or is in a valid location in which the user is required to be to access the resource. The attributes and/or location are defined by a policy assigned to the resource. To verify that the user has the required attributes, a proof is requested from the user that proves that the user has the required attributes. Upon validating the proof, the decryption key is generated and/or retrieved.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
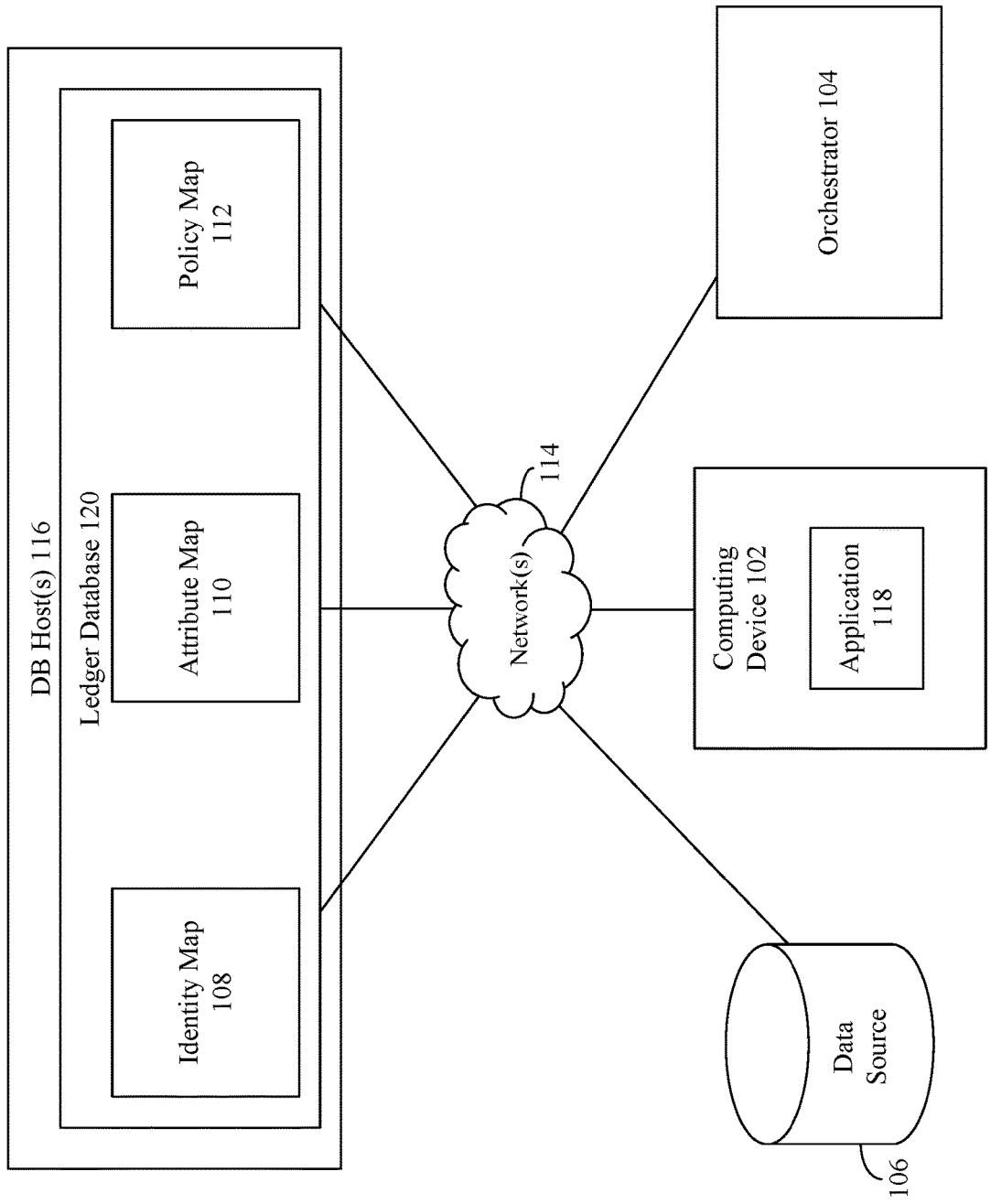
FIG. 1 shows a block diagram of an example system for recovering a decryption key in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A potential security vulnerability arises when access policies for accessing encrypted resources are enforced by trusted components of an organization (e.g., components of a particular organization or network that are assumed to be secure) that maintain the resources. If a malicious entity manages to infiltrate such resources, the malicious entity is free to move laterally and access or exfiltrate sensitive data.

Embodiments are described herein are directed to recovering a decryption key utilized to decrypt an encrypted resource via a zero-trust distributed architecture. For example, a determination is made as to whether a user and/or the user's computing device attempting to access an encrypted resource has the necessary attributes to access the resource and/or is in a valid location in which the user is required to be to access the resource. The attributes and/or location are defined by a policy assigned to the resource. To verify that the user has the required attributes, a proof is requested from the user that proves that the user has the required attributes. Upon validating the proof, the decryption key is generated and/or retrieved.

The techniques described herein provide cryptographic enforcement, in a zero-trust model (and other models), end-to-end across various types of data, services, and organizations. In particular, one or more components (e.g., component(s) that perform policy verification, proof verification, and/or key recovery) may not be considered as "trusted." Such untrusted components are not entrusted to store sensitive data, such as decryption keys, due to a risk of the sensitive data being compromised thereon. Instead, such component(s) simply maintain the necessary information to release such keys.

Accordingly, the techniques described herein advantageously provide improvements in other technologies, namely data encryption, security, and privacy. For instance, by utilizing a zero-trust model, access to sensitive data, such as decryption keys, is made available only to users and environments that meet policy requirements, and is prevented to all other users and environments, including the administrators of the systems and services that enforce policy. By doing so, the techniques described herein also prevent access to a user's network and computing entities (e.g., computing devices, virtual machines, etc.). By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

FIG. 1 shows a block diagram of an example system 100 for recovering a decryption key, according to an example embodiment. As shown in FIG. 1, system 100 includes a computing device 102, an orchestrator 104, a data source 106, and one or more database (DB) hosts 116. DB host(s) 116 comprise one or more server computers or computing devices, which include one or more distributed or "cloud-based" servers, in embodiments. In embodiments, DB host(s) 116 are associated with, or are a part of, a cloud-based service platform and in some embodiments, DB host(s) 116 comprise one or more on-premises servers in addition to, or in lieu of, cloud-based server(s). DB host(s) 116 are configured to host and execute any type of DB server application, such as but not limited to, Azure SQL Database™ from Microsoft Corporation of Redmond, WA. In embodiments, computing device 102, DB hosts(s) 116, orchestrator 104, and/or data source 106, are communicatively coupled via one or more networks 114, comprising one or more of local area networks (LANs), wide area networks (WANs), enterprise networks, the Internet, etc., and includes one or more of wired and/or wireless portions. Computing device 102 is any type of processing device, including, but not limited to, a desktop computer, a server, a mobile or handheld device (e.g., a tablet, a personal data assistant (PDA), a smart phone, a laptop, etc.), an Internet-of-Things (IoT) device, etc. Orchestrator 104 comprises one or more server computers or computing devices, which include one or more distributed or "cloud-based" servers, in embodiments. In embodiments, orchestrator 104 is associated with, or are a part of, a cloud-based service platform and in some embodiments, orchestrator 104 comprises on-premises server(s) in addition to, or in lieu of, cloud-based servers.

As shown in FIG. 1, DB host(s) 116 execute a ledger database 120. Ledger database 120 provides tamper-evidence capabilities for database tables of ledger database 120 (referred to as ledger tables), where one can cryptographically attest to other parties, such as auditors or other parties that the data maintained by the database has not been tampered with. Ledger database 120 protects data from any attacker or high-privileged user, including database administrators, system administrators, and cloud administrators. As with a traditional ledger, historical data is preserved. If a row is updated in a ledger table, its previous value is maintained and protected in a history table. Ledger database 120 provides a chronicle of all changes made to the database over time. In accordance with an embodiment, historical data is maintained in a relational form to support queries (e.g., SQL queries) for auditing, forensics, and other purposes.

Any rows modified by a transaction in a ledger table is cryptographically hashed (e.g., SHA-256 hashed) using a data structure, such as a Merkle tree, that creates a root hash representing all rows in the transaction. The transactions that ledger database 120 processes are then also hashed together through another Merkle tree data structure. The result is a root hash that forms a block. The block is then hashed through the root hash of the block, along with the root hash of the previous block as input to the hash function. That hashing forms a blockchain. The root hashes, also referred herein as database digests, contain the cryptographically hashed transactions and represent the state of the database at the time the digests were generated. In accordance with an embodiment, the digests are periodically generated and stored outside the database in tamper-proof storage. Digests are later used to verify the integrity of the database by comparing the value of the hash in the digest against the calculated hashes in database.

Materialized views of ledger tables are generated in fixed periodic intervals referred to as epochs. Ledger database 120 is also configured to provide forward integrity, which guarantees that given a materialized view of a ledger table at any time t, it is infeasible to tamper the ledger table in any subsequent epoch.

Ledger database 120 is configured to store and protect any type of data or information, including, but not limited to a verifiable identity map 108, a verifiable attribute map 110, and a verifiable policy map 112. Identity map 108 is configured to store an identity for each of a plurality of users (e.g., members, employees, etc.), for example, of an organization. Each identity comprises information that uniquely identifies the user within the organization. Examples of the identity include, but are not limited to, the user's email address, the user's phone number, the user's username, or any other type of information that uniquely identifies the user. Identity map 108 is also configured to store, for each user, a public signing key of the user in association with the identity of the user, and/or a public encryption key of the user in association with the identity of the user.

Attribute map 110 is configured to store one or more attributes for each of a plurality of users of the organization. Each of the attribute(s) for a particular user are stored in association with the identity of that user. Examples of attribute(s) include, but are not limited to, a security clearance level of the user (e.g., confidential, secret, top secret, top secret, top secret special access etc.), a rank (e.g., lieutenant, captain, major, colonel, etc.) of the user within an organization (e.g., such as a military organization), a role of the user within an organization (e.g., a field agent, an analyst, a manager, a director, a chief technology officer, a chief executive officer, etc.), etc. Attribute map 110 is also configured to store, for each user, one or more encrypted shared secrets (e.g., one or more pieces of data, such as a password, a private key, a public key, a string of characters and/or random numbers, etc. that are encoded in accordance with an encryption technique, such as, but not limited to, an advanced encryption standard (AES)-based technique). Each of the shared secret(s) for a particular user are stored in association with the identity of that user. Attribute map 110 also associates each encrypted shared secret with a corresponding attribute of the attributes stored in attribute map 110. As described below, the encrypted shared secret(s) are utilized to verify whether a user is actually associated with corresponding attributes. In accordance with an embodiment, the shared secret(s) of a user stored in attribute map 110 are encrypted with a private encryption key of that user. Attribute map 110 is also configured to store, for each attribute, a public encryption key, which, as will be described below, is utilized to generate and verify cryptographic proofs. Attribute map 110 associates each public encryption key with a corresponding attribute and corresponding encrypted secret share of the attributes stored in attribute map 110.

Policy map 112 is configured to store one or more policies for resources (e.g., accessible pieces of data on which one or more operations can be performed) maintained by data source 106. Each of the polic(ies) specify one or more conditions that are required to be satisfied for a user to perform a certain action with respect to a corresponding resource. Policy map 112 associates each of the polic(ies) with a policy identifier (ID), which uniquely identifies a corresponding policy. Such actions include, but are not limited to, the releasing of a decryption key, accessing a resource (e.g., reading or writing to a resource) via the released decryption key, sending the resource to another user, sending a communication to another user, etc. The conditions include, but are not limited to, a particular identity of a particular user authorized to perform the action, particular attributes that the identity (or user) and/or the user's computing device or environment is required to have to perform the action, a location at which the user (and/or a computing device associated therewith) is required to be to perform the action, and/or the like. Examples of resources include, but are not limited to, a data file (e.g., a document), a database object (e.g., a table, a directory, etc.), structured data, unstructured data, semi-structured data, a data container, etc. Examples of locations include, but are not limited to, a particular room or building, a particular vehicle or vessel (e.g., a particular car, a particular submarine, a particular aircraft carrier, etc.), a particular city, a particular country, etc.

To initially generate identity map 108, the organization obtains the identities of its members and stores the identities in a column of identity map 108 configured to store identities. The organization also obtains the public signing keys of its members and stores the long-term public signing keys in a column 116 of identity map 108 configured to store long-term public signing keys.

The organization signs identity map 108, attribute map 110, and/or policy map 112 using its own private signing key. Identity map 108, attribute map 110, and/or policy map 112 are considered to be trusted and verifiable, as the binding between respective identities and long-term public signing keys is signed by the private signing key of the organization and is verifiable using the public signing key corresponding to the private signing key of the organization. It is noted that an organization may publish an identity map, attribute map, and/or policy map that refers to identities, attributes, and/or policies, respectively, published by other organizations.

Ledger database 120 is configured to provide users of identity map 108, attribute map and/or policy map 112 (e.g., the user of computing device 102) access to a digest, which is representative of the state of ledger database 120 (including identity map 108, attribute map, and policy map 112). For example, as shown in FIG. 1, computing device 102 may store the digest. It is noted that in embodiments, ledger database 120 is configured to provide access to some or all of the digests that are generated by ledger database 120 over time.

Figure 2:
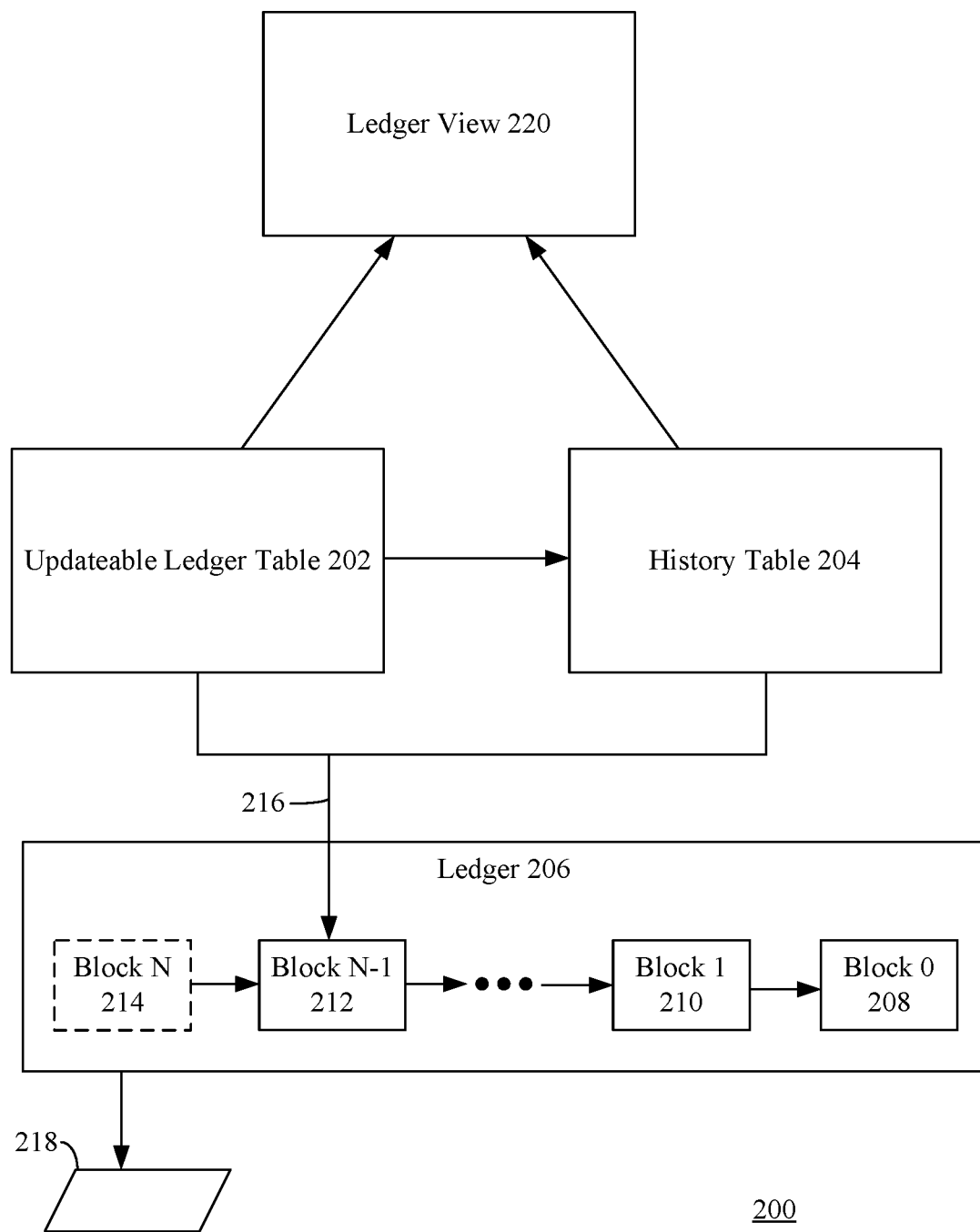
FIG. 2 depicts a block diagram of a ledger database in accordance with an example embodiment.

FIG. 2 depicts a block diagram of a ledger database 200 in accordance with an example embodiment. Ledger database 200 is an example of ledger database 120, a described above with reference to FIG. 1. As shown in FIG. 2, ledger database 200 comprises at least a current (or updateable) ledger table 202, a history table 204, and a ledger 206.

Current table 202 includes entries (or rows) of data, each entry having a number of columns. Current table 202 exemplarily includes, for illustrative purposes, an identity map, an attribute map 110 and/or a policy map 112 (e.g., identity map 108, attribute map 110, and/or policy map 112, as shown in FIG. 1). Likewise, history table 204 includes similar, or the same, columns for rows of entries therein, but the rows of history table 204 include data reflecting each transaction that changes data in current table 202 (e.g., modify, delete, etc.). For example, if a row is updated in the database, its previous value is maintained and protected in history table 204.

Ledger 206 is a cryptographic data structure that comprises a blockchain. Ledger 206 includes a number of blocks having block IDs: a genesis block 208 (ID 'Block 0'), a first block 210 (ID 'Block 1'), etc., up to a current block 212 (ID 'Block N−1'), and it should be noted that additional blocks such as a future block 214 (ID 'Block N') may be generated for maintenance of the blockchain as additional entries are changed in current table 202 and prior entries are reflected in history table 204. Each block of the blockchain of ledger 206 includes at least a block ID, a hash value of the immediately preceding block (e.g., a SHA-256-based hash), and a root hash value representative of all the rows of the database post-update (e.g., a SHA-256 hash generated via a Merkle tree data structure), according to embodiments.

In the initial state of ledger 206, genesis block 208 (ID Block '0') has no meaningful prior hash value (zero) stored. However, after some time period in which transactions affect entries in current table 202 and history table 204, first block 210 (ID 'Block 1') is generated and completed which stores the hash value over 'Block 0'.

The root hash value of the latest block (e.g., current block 212) in ledger 206 is referred to as a digest (shown as digest 218), which captures a validity state of current table 202, history table 204, and ledger 206. In this way, a single hash value, e.g., in digest 218, enables verification to be performed on data in the database, e.g., in current table 202, history table 204, and ledger 206, that was present at and before generation of digest 218. Digest 218 is stored in secure storage and/or published (e.g., via a website) for use by users of computing devices 102A-102N (as shown in FIG. 1).

As an example, suppose Block N−2 is the current block in ledger 206 and a transaction is received to update current table 202. In this example, history table 204 is updated to store the information stored in current table 202, and current table 202 is updated in accordance with the transaction. A new block in ledger 206 for the transaction is generated (e.g., current block 212). A transaction hash value 216 is then generated over the entry in history table 204 and a changed entry in current table 202 that is generated by the transaction that was performed on the entry. Transaction hash value 216 is inserted into block 212. To generate the root hash value, the updated rows are inserted as leaf nodes of a hierarchical hash data structure, such as a Merkle tree. Each leaf node is then hashed (e.g., SHA-256 hashed) to generate a hash value for the leaf nodes. For each node that is not a leaf, a hash value is generated therefor that is based on the hash values of its child nodes. A root hash value of the hierarchical hash data structure (e.g., a root hash value of the root node of the hierarchical hash data structure) is then determined based on the hash values of its child nodes and utilized as the root hash value (and digest 218) stored in current block 212.

It is noted that any given block comprises any number of transactions. A new block is generated responsive to one or more events, including, but not limited to, expiry of a predetermined time period (e.g., 30 seconds), when a block reaches a maximum number of transactions (e.g., 100,000), etc.

Additionally, with respect to FIG. 2, embodiments provide for a view of a ledger (i.e., a ledger view table 220) that comprises a union of current table 202 and history table 204. Ledger view table 220 is queryable or otherwise operatable via database operations and thus, provides a consolidate view of the current state of the data as well as all transactions previously performed on the current table.

Referring again to FIG. 1, in accordance with one or more embodiments, each of identity map 108, attribute map 110, and policy map 112 are maintained in a respective table of a database. For example, with respect to identity map 108, a first column of identity map 108 stores user identities, a second column stores public signing keys, a third column stores public encryption keys, etc. With respect to attribute map 110, a first column of attribute map 110 stores user identities, a second column stores first attributes, a third column stores second attributes, a fourth column stores first encrypted shared secrets associated with the first attributes, a fifth column stores second encrypted shared secrets associated with the second attributes, a sixth column stores a first public encryption key associated with the first attributes and/or first encrypted shared secrets, a seventh column stores a second public encryption key associated with the second attributes and/or second encrypted shared secrets, etc. With respect to policy map 112, a first column stores policy IDs, a second column stores the policies, etc.

In accordance with one or more embodiments, one or more columns of identity map 108, attribute map 110, and/or policy map 112 are maintained together in a single table of a database. An example of a database via which identity map 108, attribute map 110, and/or policy map 112 are maintained includes, but is not limited to, Azure SQL Database™ from Microsoft® Corporation of Redmond, Washington.

As also shown in FIG. 1, computing device 102 comprises an application 118. Application 118 is any software application that is utilized to access a resource, encrypt a resource, and/or decrypt a resource. Examples of application 118, but are not limited to, a messaging application (e.g., Microsoft Teams™ published by Microsoft Corporation of Redmond, WA), a word processing application (e.g., Microsoft Word™ published by Microsoft Corporation), a database application, etc.

Application 118 is configured to access a resource, for example, maintained by data source 106. Data source 106 also comprises a policy ID specified for each resource maintained thereby. In accordance with an embodiment, the policy ID is stored as metadata associated with the resource. Examples of data source 106 include, but are not limited to, a data store, a file repository, a database, etc. The resource may be encrypted (e.g., the resource is encoded in accordance with an encryption technique, such as, but not limited to, an AES-based technique). In such a case, application 118 requires the resource to be decrypted (e.g., decoded in accordance with a decryption technique, such as, but not limited to, an AES-based technique), for example, using a decryption key, in order to access it. The decryption key is released if a policy (e.g., an access policy) associated with the resource is satisfied, thereby enabling the resource to be decrypted.

Orchestrator 104 is configured to facilitate a determination as to whether the policy for a resource attempted to be accessed by application 118 is satisfied. For example, orchestrator facilitates the determination as to whether the user has the necessary attributes and/or is at a location specified by the policy. Upon determining that the policy is satisfied, orchestrator 104 obtains (or recovers) the decryption key and/or provides the decryption key to application 118, which decrypts the resource. Alternatively, orchestrator 104 (or another component coupled thereto) decrypts the resource using the decryption key, and the decrypted resource is provided to application 118.

Additional details regarding recovering the decryption key is provided below. In particular, Subsection A describes an embodiment in which orchestrator 104 is trusted to properly evaluate the policy and obtains the decryption key from a trusted key manager. Subsection B describes an embodiment in which orchestrator 104 is untrusted to properly evaluate the policy and obtains the decryption key from a trusted key manager. Here, an untrusted location attribute policy (LAP) server is configured to evaluate the policy. Subsection C describes an embodiment in which an untrusted LAP server is configured to fully evaluate the policy and obtains the decryption key from an untrusted key generator.

A. Key Provision Via a Trusted Orchestrator and Key Manager

Figure 3:
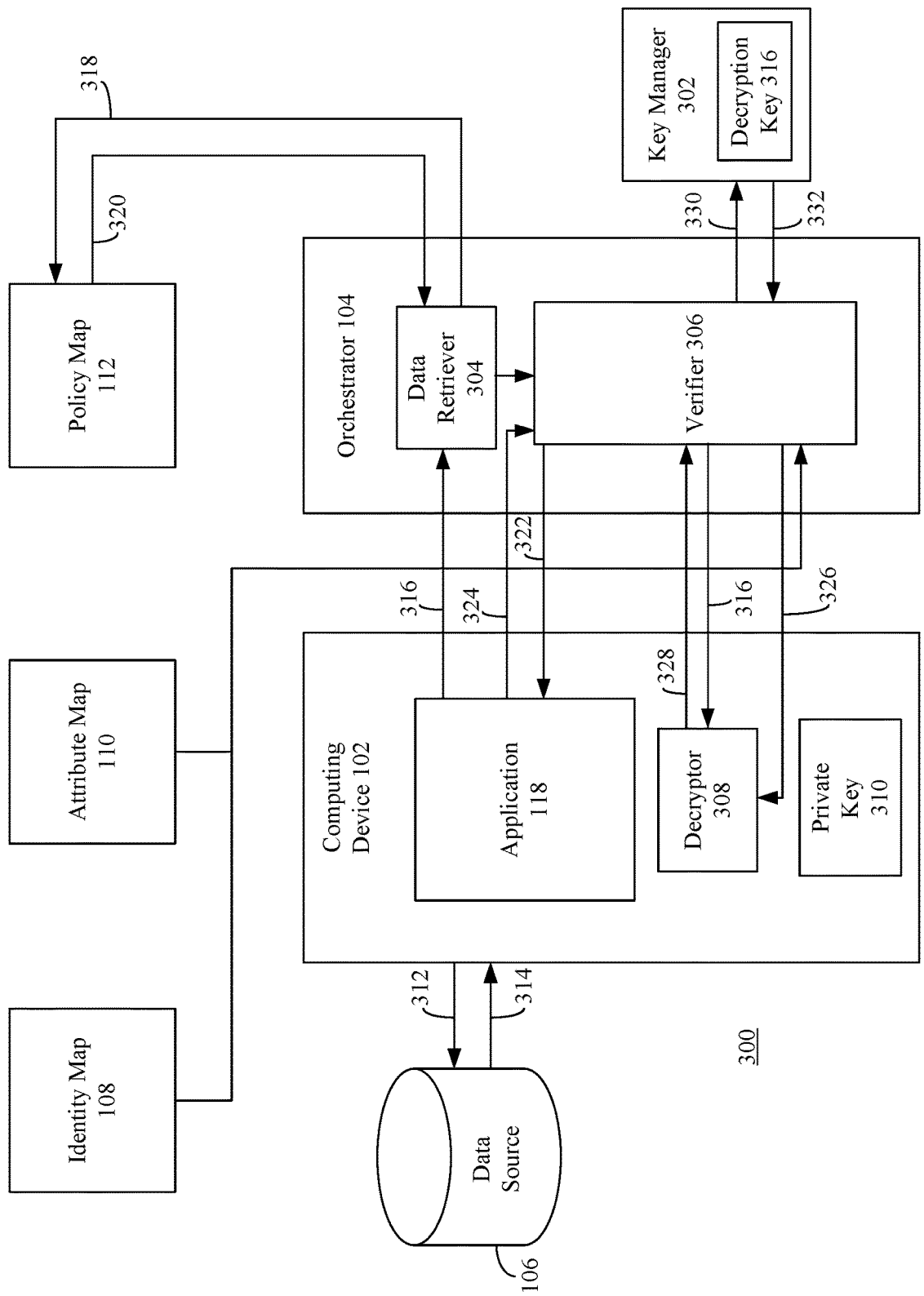
FIG. 3 depicts a block diagram of a system for obtaining a decryption key in accordance with an embodiment.

FIG. 3 depicts a block diagram of a system 300 for obtaining a decryption key in accordance with an embodiment. As shown in FIG. 3, system 300 includes computing device 102, orchestrator 104, data source 106, identity map 108, attribute map 110, policy map 112, and a key manager 302, which stores one or more decryption keys (e.g., decryption key 316) for decrypting resources stored by data source 106. In accordance with an embodiment, key manager 302 is included as part of orchestrator 104. In accordance with another embodiment, key manager 302 comprises server computer(s) or computing device(s), which include one or more distributed or "cloud-based" servers, in embodiments. In embodiments, key manager 302 is associated with, or are a part of, a cloud-based service platform and in some embodiments, key manager 302 comprises on-premises server(s) in addition to, or in lieu of, cloud-based servers. As further shown in FIG. 3, orchestrator 104 comprise a data retriever 304 and a verifier 306. Computing device 102 comprises application 118, a decryptor 308, and a private encryption key 310.

To request a resource, application 118 provides a request 312 identifying the resource to data source 106. Data source 106 is configured to return a response 314 including the encrypted resource and/or specifying at least the policy ID that identifies the policy associated with the requested resource and/or an organization that specifies and/or maintains the policy.

Application 118 provides the policy ID to orchestrator 104 via a request 316. In accordance with an embodiment, various organizations maintain respective orchestrators, each configured to determine a policy for resources associated therewith. In accordance with an embodiment, the organization identified via response 314 is a uniform resource identifier (URI) (e.g., a uniform resource locator (URL)), or an identifier utilized to lookup the URI, at which an orchestrator of the organization and/or an identity map, attribute map, and/or policy map associated with the organization are located. In accordance with such an embodiment, response 314 is provided to the orchestrator corresponding to the URI thereof.

Data retriever 304 is configured to provide a request 318 to policy map 112 associated with the organization that specifies the policy ID. Policy map 112 looks up the policy associated with policy ID and returns the policy to data retriever 304 via a response 320. Data retriever 304 analyzes the policy to determine the identit(ies) and/or attribute(s) that are required to access the resource requested by application 118. For instance, the policy specifies an identity at the organization that is allowed to access the resource, specifies that the user requires a first attribute (e.g., the user is required to have a rank level of captain), a second attribute (the user is required to have a top secret security clearance level, and/or location information that specifies that the user must be in a particular location (e.g., aboard a particular submarine) to access the resource. Data retriever 304 provides the determined identit(ies) and/or attribute(s) to verifier 306.

Verifier 306 is configured to determine whether the user has the proper identity. For instance, verifier 306 requests application 118 to prove that the user has the proper identity. In accordance with an embodiment, to prove the user's identity, verifier 306 first provides a request 322 to application 118 for the user's identity (e.g., username, email address, etc.). Application 118 provides verifier 306 the user's identity via a response 324. Responsive to receiving response 324, verifier 306 retrieves the public encryption key associated with the identity from identity map 108. It is noted that the techniques described herein to prove a user's identity are purely exemplary and that other techniques may be utilized to prove a user's identity.

Verifier 306 then generates a nonce (e.g., a randomly-generated number intended to prevent replay attacks) and encrypts the nonce using the public encryption key associated with the identity. Verifier 306 also maintains a copy of the nonce. Verifier 306 provides the encrypted nonce to computing device 102 via a request 326.

Decryptor 308 of computing device 102 is configured to decrypt the nonce using private encryption key 310 and provides the decrypted nonce to verifier 306 via a response 328. In accordance with an embodiment, decryptor 308 is a separate component (e.g., a software application, a hardware-based cryptoprocessor, etc.) from application 118 (as shown in FIG. 1). In accordance with another embodiment, decryptor 308 is incorporated in application 118. Private encryption key 310 is stored locally in a secure environment of computing device 102. Examples of a secure environment include, but are not limited to, a trusted platform module (TPM), a hardware security module (HSM), or any type of secure hardware and/or software-based cryptoprocessor.

Verifier 306 is configured to compare the decrypted nonce to the locally-stored nonce. If the nonces match, then verifier 306 determines that the user has the proper identity. Otherwise, verifier 306 determines that the user does not have the proper identity and access to the encrypted resource is denied.

To determine that the user has the proper attributes, verifier 306 retrieves the attribute(s) associated with the identity in attribute map 110 and compares the retrieved attributes to the attributes of the policy received by data retriever 304. If the attributes match, then verifier 306 sends a request 330 for the decryption key (e.g., decryption key 316) associated with the resource to key manager 302. For instance, request 330 may specify a resource identifier that uniquely identifies the resource and that is associated with the corresponding decryption key. Key manager 302 returns the decryption key (e.g., decryption key 316) corresponding to the resource to verifier 306 via a response 332.

In accordance with an embodiment, verifier 306 provides decryption key 316 to decryptor 308, and decryptor 308 decrypts the resource for application 118. In accordance with another embodiment, key manager 302 encrypts decryption key 316 using the public encryption key of an entity (e.g., the user (as stored in identity map 108) the user's application (e.g., application 118), a document management and storage system (e.g., Microsoft SharePoint™ published by Microsoft® Corp.) that is to decrypt the resource, etc.). The public encryption key is retrieved from identity map 108. In accordance with such an embodiment, verifier 306 sends the encrypted decryption key to the entity (e.g., application 118). Decryptor 308 then decrypts the encrypted decryption key using the private encryption key (e.g., private key 310) corresponding to the public encryption key. By doing so, decryption key 316 is protected from rogue users that may intercept communications between orchestrator 104 and computing device 102. In accordance with a further embodiment, orchestrator 104 comprises a decryptor that decrypts the resource, and orchestrator 104 provides the decrypted resource to application 118. This way, application 118 is not required to perform the decryption.

In accordance with the techniques described in this subsection, orchestrator 104 is trusted to properly evaluate the policy to access the resource, and key manager 302 is trusted to store decryption key 316.

Figure 4:
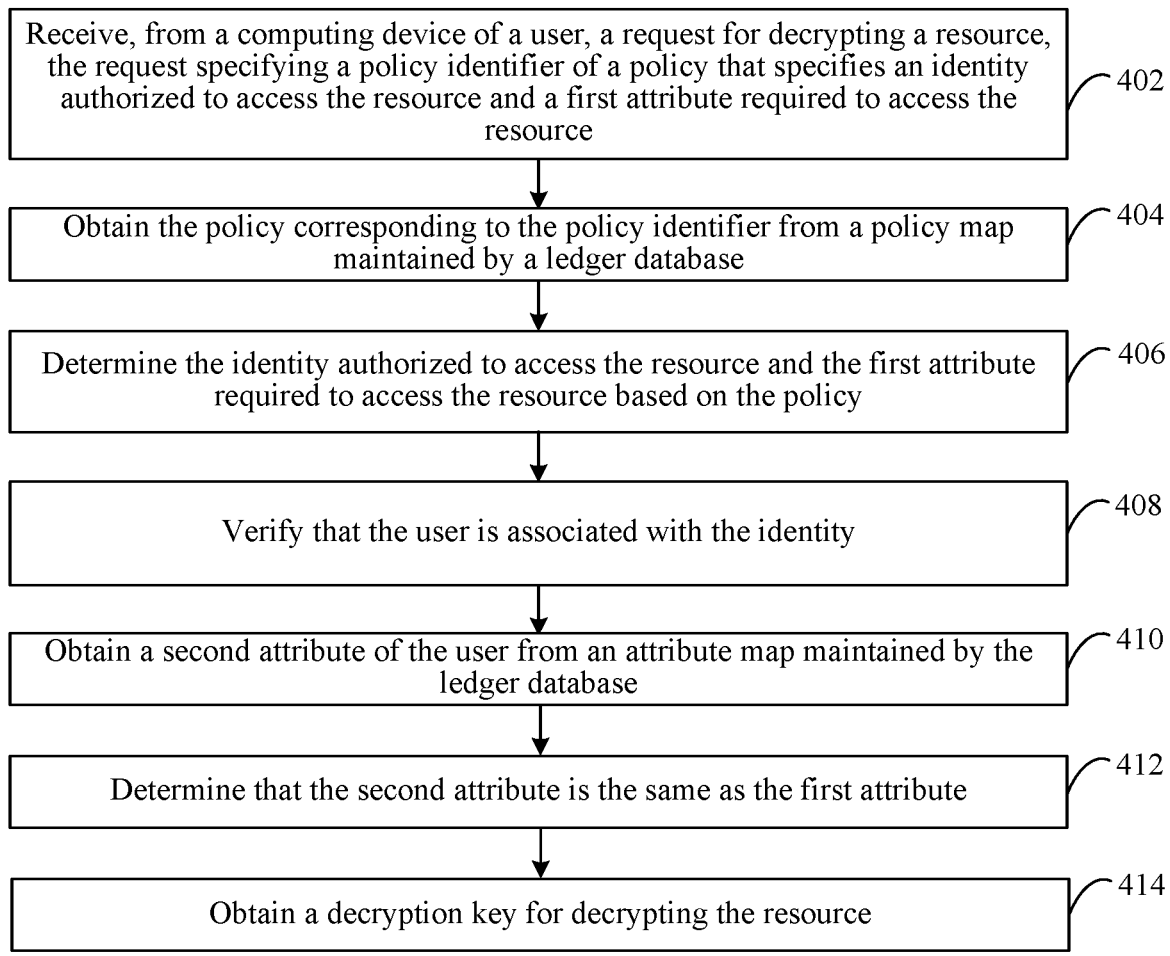
FIG. 4 shows a flowchart for obtaining a decryption key in accordance with an embodiment.

Accordingly, a decryption key is obtained in many ways. For example, FIG. 4 shows a flowchart 400 for obtaining a decryption key, according to an example embodiment. In an embodiment, flowchart 400 is implemented by system 300, as shown in FIG. 3. Accordingly, flowchart 400 will be described with continued reference to FIG. 3. Other structural and operational embodiments will be apparent to persons skilled in the relevant art(s) based on the following discussion regarding flowchart 400 and system 300 of FIG. 3.

Flowchart 400 begins with step 402. In step 402, a request, from a computing device of a user, is received for decrypting a resource. The request specifies a policy identifier of a policy that specifies an identity authorized to access the resource and a first attribute required to access the resource. For example, with reference to FIG. 3, data retriever 304 of orchestrator 104 receives request 316 from application 118 of computing device 102 for decrypting a resource stored in data source 106. Request 316 specifies a policy identifier of a policy that specifies an identity authorized to access the resource and a first attribute required to access the resource.

In accordance with one or more embodiments, the first attribute comprises at least one of a clearance level of the user, a rank of the user within an organization, or a role of the user within the organization.

In accordance with one or more embodiments, the resource comprises at least one of a data file, a database object, structured data, unstructured data, or a data container.

In step 404, the policy corresponding to the policy identifier is obtained from a policy map maintained by a ledger database. For example, with reference to FIG. 3, data retriever 304 obtains the policy corresponding to the policy identifier from policy map 112 maintained by ledger database 120 (as described above with reference to FIG. 1). For instance, data retriever 304 provides request 318 specifying the policy identifier to policy map 112. Policy map 112 looks up the policy using the policy identifier and returns the policy to data retriever 304 via response 320.

In step 406, the identity authorized to access the resource and the first attribute required to access the resource is determined based on the policy. For example, with reference to FIG. 3, data retriever 304 analyzes the policy to determine the identity authorized to access the resource and the first attribute required to access the resource.

In step 408, a verification is made that the user is associated with the identity. For example, with reference to FIG. 3, verifier 306 verifies that the user is associated with the identity. Additional details regarding verifying that the user is associated with the identity is provided below with reference to FIGS. 9 and 10.

In step 410, responsive to verifying that the user is associated with the identity, a second attribute of the user is obtained from an attribute map maintained by the ledger database. For example, with reference to FIG. 3, responsive to verifying that the user is associated with the identity, verifier 306 obtains a second attribute of the user from attribute map 110 maintained by ledger database 120 (as described above with reference to FIG. 1). For instance, verifier 306 provides a request specifying the user's identity to attribute map 110. Attribute map 110 looks up the identity's attribute(s) and provides the attribute(s) to verifier 306 via a response.

In step 412, a determination is made that the second attribute is the same as the first attribute. For example, with reference to FIG. 3, verifier 306 determines that the second attribute is the same as the first attribute.

In step 414, responsive to determining that second attribute is the same as the first attribute, a decryption key for decrypting the resource is obtained. For example, with reference to FIG. 3, verifier 306 provides request 330 to key manager 302. Key manager 302 returns decryption key 316 for decrypting the resource to verifier 306 via response 332.

Figure 5:
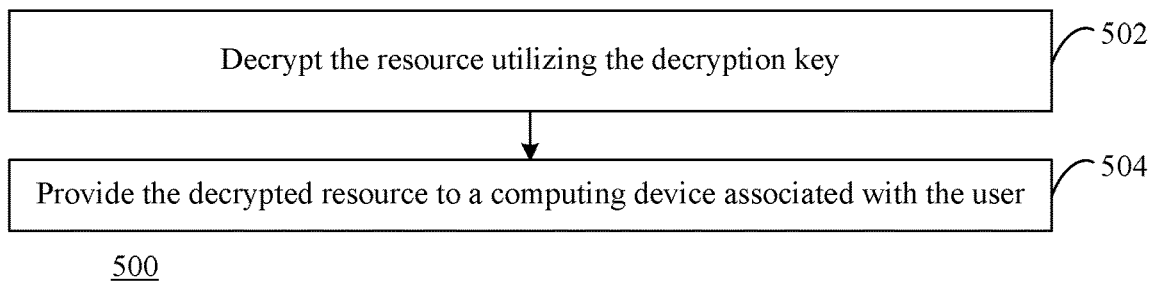
FIG. 5 shows a flowchart for decrypting a resource in accordance with an example embodiment.
Figure 6:
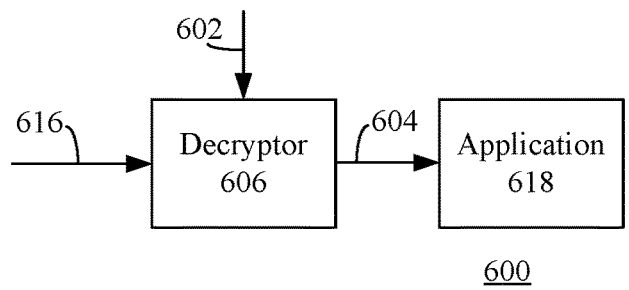
FIG. 6 depicts a block diagram of a system for decrypting a resource in accordance with an example embodiment.

In accordance with one or more embodiments, the resource is decrypted using the decryption key and provided to the requesting application. For example, FIG. 5 shows a flowchart 500 for decrypting a resource, according to an example embodiment. In an embodiment, flowchart 500 is implemented by a system 600, as shown in FIG. 6. Accordingly, flowchart 500 will be described with reference to FIG. 6. FIG. 6 depicts a block diagram of a system 600 for decrypting a resource at an orchestrator (e.g., orchestrator 104, as shown in FIG. 3) in accordance with an example embodiment. As shown in FIG. 6, system 600 comprises a decryptor 606 and an application 618. Decryptor 606 is configured to execute on a key manager (e.g., key manger 302, as shown in FIG. 3). Application 618 is an example of application 118, as described above with reference to FIG. 3, and is configured to execute on a user's computing device (e.g., computing device 102, as described above with reference to FIG. 1). Other structural and operational embodiments will be apparent to persons skilled in the relevant art(s) based on the following discussion regarding flowchart 500 and system 600 of FIG. 6.

Flowchart 500 begins with step 502. In step 502, the resource is decrypted utilizing the decryption key. For example, with reference to FIG. 6, decryptor 606 is configured to decrypt the resource (shown as resource 602) using a decryption key 616. Decryption key 616 is an example of decryption key 316, as described above with reference to FIG. 3. In accordance with an embodiment, decryptor 606 is configured to receive resource 602 from application 618. For instance, when retrieving the resource from a data source (e.g., data source, as described above with reference to FIG. 3), the data source returns the encrypted resource to application 618, and application 618 provides the encrypted resource to orchestrator 104 along with the policy ID associated with the resource (e.g., via request 316, as described above with reference to FIG. 3).

In step 504, the encrypted resource is provided to a computing device associated with the user. For example, with reference to FIG. 6, decryptor 606 provides the decrypted resource (shown as decrypted resource 604) to application 618, which executes on a computing device (e.g., computing device 102, as described above with reference to FIG. 2).

Figure 7:
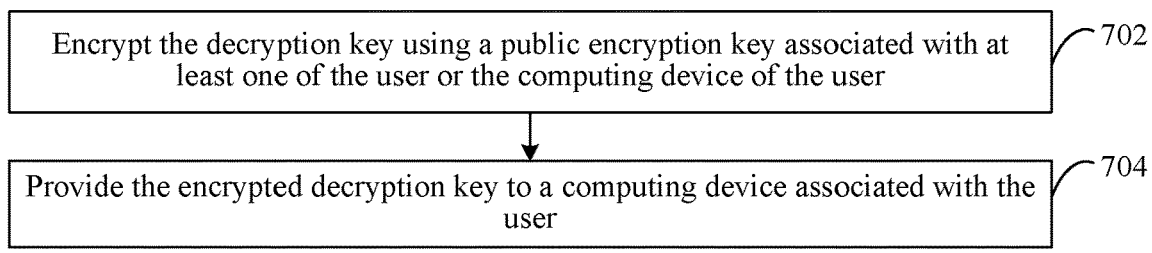
FIG. 7 shows a flowchart for encrypting a decryption key using a public encryption key of the user in accordance with an example embodiment.
Figure 8:
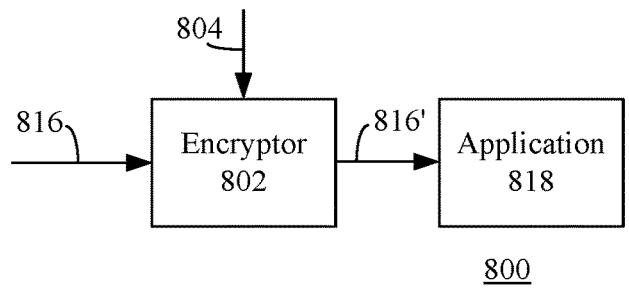
FIG. 8 depicts a block diagram of a system for encrypting a decryption key using a public encryption key of the user in accordance with an example embodiment.

In accordance with one or more embodiments, the decryption key is encrypted with a public encryption key of the user. For example, FIG. 7 shows a flowchart 700 for encrypting a decryption key using a public encryption key of the user in accordance with an example embodiment. In an embodiment, flowchart 700 is implemented by a system 800, as shown in FIG. 8. Accordingly, flowchart 700 will be described with reference to FIG. 8. FIG. 8 depicts a block diagram of a system 800 for encrypting a decryption key using a public encryption key of the user in accordance with an example embodiment. As shown in FIG. 8, system 800 comprises an encryptor 802 and an application 818. Encryptor 802 is configured to be executed by key manager 302 (as shown in FIG. 3). Application 818 is an example of application 118, as described above with reference to FIG. 3, and is configured to execute on a user's computing device (e.g., computing device 102, as described above with reference to FIG. 1). Other structural and operational embodiments will be apparent to persons skilled in the relevant art(s) based on the following discussion regarding flowchart 700 and system 800 of FIG. 8.

Flowchart 700 begins with step 702. In step 702, the decryption key is encrypted using a public encryption key associated with at least one of the user or the computing device of the user. For example, with reference to FIG. 8, encryptor 802 encrypts a decryption key 816 using a public encryption key 804. Decryption key 816 is an example of decryption key 316, as described above with reference to FIG. 3. Public encryption key is retrievable from an identity map (e.g., identity map 108, as described above with reference to FIG. 1).

In step 704, the encrypted decryption key is provided to a computing device associated with the user. For example, with reference to FIG. 8, encryptor 802 provides the encrypted decryption key (shown as encrypted decryption key 816') to application 818, which executes on a computing device (e.g., computing device 102, as described above with reference to FIG. 3). Application 818 is configured to decrypt encrypted decryption key 816' using a private encryption key (e.g., private key 310, as described above with reference to FIG. 3) corresponding to public encryption key 804.

Figure 9:
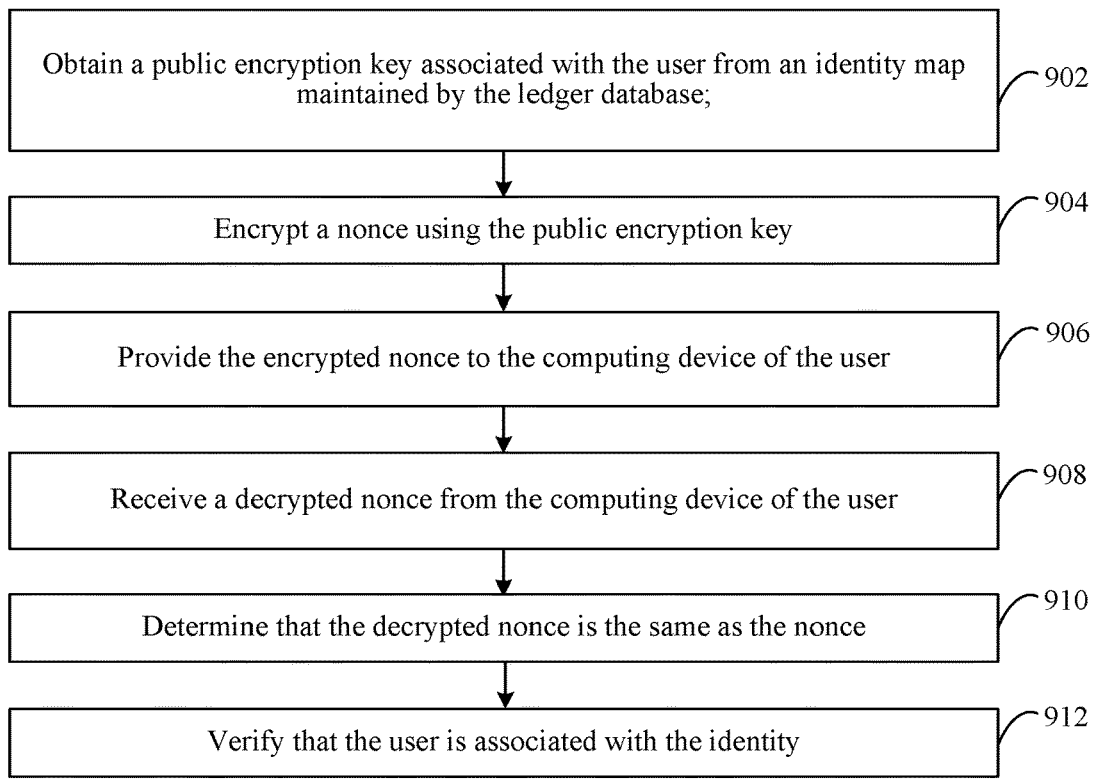
FIG. 9 shows a flowchart for verifying that a user is associated with an identity in accordance with an example embodiment.
Figure 10:
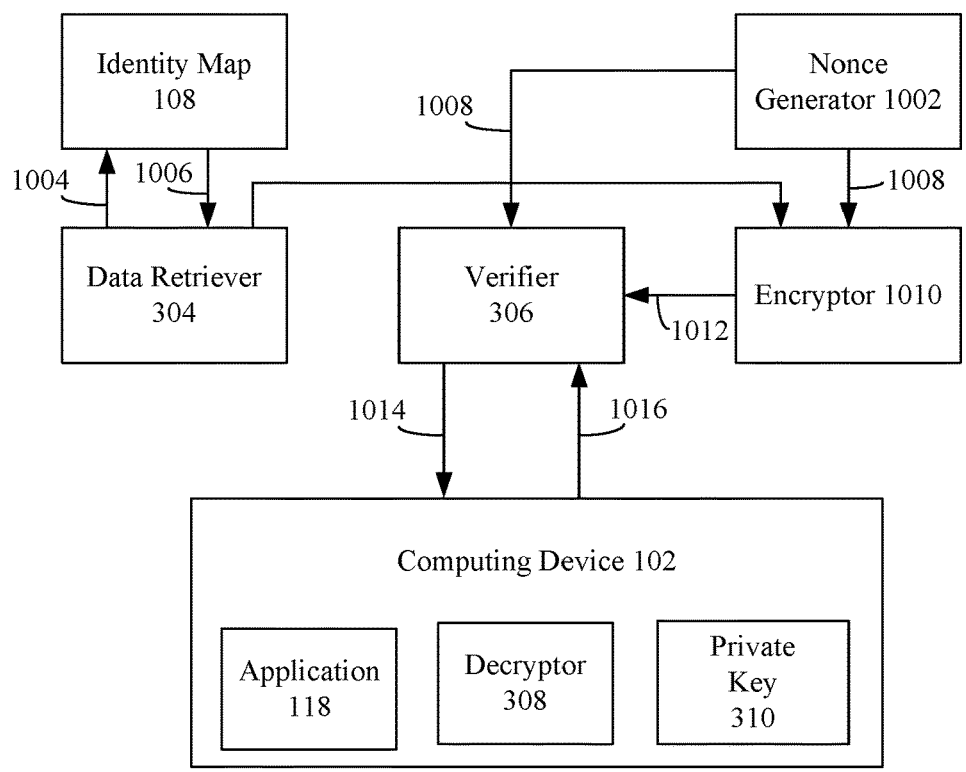
FIG. 10 depicts a block diagram of a system for verifying that a user is associated with an identity in accordance with an example embodiment.

FIG. 9 shows a flowchart 900 for verifying that a user is associated with an identity, according to an example embodiment. In an embodiment, flowchart 900 is implemented by a system 1000, as shown in FIG. 10. Accordingly, flowchart 900 will be described with reference to FIG. 10. FIG. 10 depicts a block diagram of a system 1000 for verifying that a user is associated with an identity in accordance with an example embodiment. As shown in FIG. 10, system 1000 comprises identity map 108, data retriever 304, verifier 306, computing device 102, a nonce generator 1002, and an encryptor 1010. In accordance with an embodiment, data retriever 304, verifier 306, nonce generator 1002, and encryptor 1010 are incorporated into an orchestrator (e.g., orchestrator 104, as shown in FIG. 3) communicatively coupled to computing device 102. Other structural and operational embodiments will be apparent to persons skilled in the relevant art(s) based on the following discussion regarding flowchart 900 and system 1000 of FIG. 10.

Flowchart 900 begins with step 902. In step 902, a public encryption key associated with the user is obtained from an identity map maintained by the ledger database. For instance, with reference to FIG. 10, verifier 306 requests application 118 to prove that the user has the proper identity. In accordance with an embodiment, to prove the user's identity, verifier 306 first provides a request to application 118 for the user's identity (e.g., username, email address, etc.). Application 118 provides verifier 306 the user's identity. Responsive to receiving response 324, verifier 306 obtains the public encryption key associated with the identity from identity map 108. For instance, verifier 306 provides a request 1004 specifying the identity associated with the user for the user's public encryption key to identity map 108. Identity map 108 looks up the public encryption key associated with the identity and provides the public encryption key to retriever via a response 1006.

In step 904, a nonce is encrypted using the public encryption key. For instance, with reference to FIG. 10, nonce generator 1002 generates a nonce 1008 (e.g., a randomly-generated number) and provides nonce 1008 to encryptor 1010. Encryptor 1010 encrypts nonce 1008 to generate an encrypted nonce 1012. Nonce generator 1002 also provides nonce 1008 to verifier 306.

In step 906, the encrypted nonce is provided to the computing device of the user. For example, with reference to FIG. 10, verifier 306 provides encrypted nonce 1012 to computing device via a request 1014.

In step 908, a decrypted nonce is received from the computing device of the user. For example, with reference to FIG. 10, decryptor 308 decrypts encrypted nonce 1012 using private encryption key 310. Computing device 102 provides the decrypted nonce to verifier 306 via a response 1016.

In step 910, a determination is made that the decrypted nonce is the same as the nonce. For example, with reference to FIG. 10, verifier 306 compares the decrypted nonce received via response 1016 to nonce 1008 to determine whether they are the same.

In step 912, responsive to determining that the decrypted nonce is the same as the nonce, a verification is made that the user is associated with the identity. For example, with reference to FIG. 10, verifier 306 determines that the user is associated with the identity responsive to determining that the decrypted nonce is the same as the nonce.

B. Key Provision Via an Untrusted Orchestrator and a Trusted Key Manager

Figure 11:
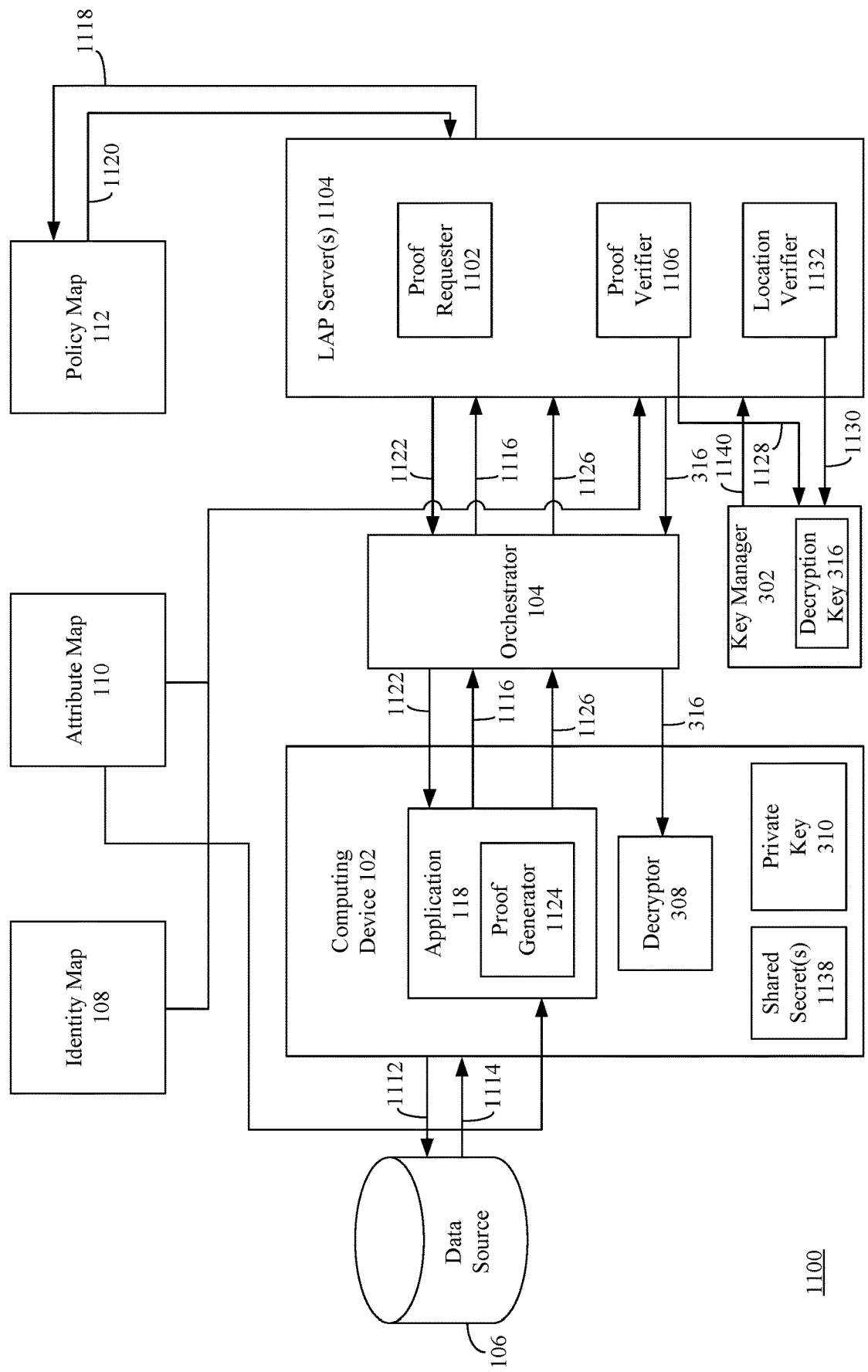
FIG. 11 depicts a block diagram of a system for obtaining a decryption key in accordance with another embodiment.

FIG. 11 depicts a block diagram of a system 1100 for obtaining a decryption key in accordance with another embodiment. As shown in FIG. 11, system 1100 includes computing device 102, orchestrator 104, data source 106, identity map 108, attribute map 110, policy map 112, key manager 302, and one or more location attribute policy (LAP) servers 1104. LAP server(s) 1104 comprise one or more server computers or computing devices, which include one or more distributed or "cloud-based" servers, in embodiments. In embodiments, LAP server(s) 1104 are associated with, or are a part of, a cloud-based service platform and in some embodiments, LAP server(s) 1104 comprise on-premises server(s) in addition to, or in lieu of, cloud-based servers. In the embodiment described in this Subsection, orchestrator 104 is not trusted to evaluate the policy. As such, orchestrator 104 acts as an intermediary between computing device 102 and LAP server(s) 1104. As described below, LAP server(s) 1104 require the user to prove their identity and/or attributes.

As further shown in FIG. 11, LAP server(s) 1104 comprise a proof requester 1102, a proof verifier 1106, and a location verifier 1132. Computing device 102 comprises application 118, decryptor 308, private encryption key 310, and one or more shared secrets 1138. In accordance with an embodiment, each of proof requester 1102, proof verifier 1106, and location verifier 1132 are included in a single LAP server of LAP server(s) 1104. In accordance with another embodiment, one or more of proof requester 1102, proof verifier 1106, and location verifier 1132 are included in a respective LAP server of LAP server(s) 1104.

To request a resource, application 118 provides a request 1112 identifying the resource to data source 106. Data source 106 is configured to return a response 1114 including the encrypted resource and/or specifying at least the policy ID that identifies the policy associated with the requested resource and/or an organization that specifies and/or maintains the policy.

Application 118 provides the policy ID to orchestrator 104 via a request 1116. Orchestrator 104 provides request 1116 to a LAP server of LAP server(s) 104. In accordance with an embodiment, application 118 also provides information that indicates a location at which computing device 102 is located via a request (e.g., request 1116). The information includes, for example, Global Positioning System (GPS) coordinates, an Internet Protocol (IP) address, etc. In accordance with an embodiment, various organizations maintain respective LAP server(s), each configured to determine a policy for resources associated therewith. In accordance with an embodiment, the organization identified via response 1114 is a uniform resource identifier (URI) (e.g., a uniform resource locator (URL)), or an identifier utilized to lookup the URI, at which LAP server(s) of the organization and/or an identity map, attribute map, and/or policy map associated with the organization are located. In accordance with such an embodiment, request 1116 is provided to the LAP server(s) corresponding to the URI thereof.

Proof requester 1102 of LAP server(s) 104 is configured to provide a request 1118 to policy map 112 associated with the organization that specifies the policy ID. Policy map 112 looks up the policy associated with policy ID and returns the policy to proof requester 1102 via a response 1120. Proof requester 1102 analyzes the policy to determine the attribute(s) that are required to access the resource requested by application 118. For instance, the policy specifies an identity at the organization that is allowed to access the resource, specifies that the user requires a first attribute (e.g., the user is required to have a rank level of captain), a second attribute (the user is required to have a top secret security clearance level, and/or location information that specifies that the user must be in a particular location (e.g., aboard a particular submarine) to access the resource.

After determining the attribute(s), proof requester 1102 is configured to determine whether the user has the proper identity and/or attributes. For instance, proof requester 1102 requests application 118 to prove that the user has the proper identity and/or attributes. To prove the user's identity, proof requester 1102 generates a nonce (e.g., a randomly-generated number intended to prevent replay attacks) and encrypts the nonce using the public encryption key of the user, which proof requester 1102 retrieves from identity map 108 associated with the organization. Proof requester 1102 also maintains a copy of the nonce. Proof requester 1102 provides the encrypted nonce to orchestrator 104 via a request 1122, which provides request 1122 to application 118.

Decryptor 308 is configured to decrypt the nonce using private encryption key 310 and provides the decrypted nonce to orchestrator 104 via a response 1126, which provides response 1126 to proof verifier 1106. In accordance with an embodiment, decryptor 308 is a separate component (e.g., a software application, a hardware-based cryptoprocessor, etc.) from application 118 (as shown in FIG. 1). In accordance with another embodiment, decryptor 308 is incorporated in application 118. Private encryption key 310 is stored locally in a secure environment of computing device 102. Examples of a secure environment include, but are not limited to, a trusted platform module (TPM), a hardware security module (HSM), or any type of secure hardware and/or software-based cryptoprocessor.

Proof verifier 1106 is configured to compare the decrypted nonce to the locally-stored nonce. If the nonces match, then proof verifier 1106 determines that the user has the proper identity. Otherwise, proof verifier 1106 determines that the user does not have the proper identity and access to the encrypted resource is denied.

To prove that the user has the proper attributes, proof requester 1102 requests application 118 to provide a zero-knowledge cryptographic proof that the user has the proper attributes via a request (e.g., request 1122). In accordance with the zero-knowledge cryptographic proof, the user (or application thereof (e.g., application 118)) proves to proof verifier 1106 that the user has the proper attributes while the user avoids conveying any additional information apart from the fact that the user has the proper attributes. In accordance with an embodiment, the request is the same request in which the encrypted nonce is provided (e.g., request 1122). In accordance with another embodiment, the request is a different request in which the encrypted nonce is provided.

The request is received by a proof generator 1124 associated with application 118. In accordance with an embodiment, proof generator 1124 is incorporated in application 118 (as shown in FIG. 11). In accordance with another embodiment, proof generator 1124 is a separate component (e.g., a software application, a hardware-based proof generator, etc.) from application 118. Proof generator 1124 is configured to generate a zero-knowledge cryptographic proof based on public encryption key(s) respectively associated with the attribute(s) specified by the policy and an unencrypted version of shared secrets (shown as shared secret(s) 1138) respectively associated with the first and second attributes. As shown in FIG. 11, shared secret(s) 1138 are stored locally at computing device 102. As described above, an encrypted version of shared secret(s) 1138 associated with the user and the public encryption key associated with the attributes are stored in attribute map 110. Accordingly, proof generator 1124 retrieves the public encryption key associated with the attributes from attribute map 110. In accordance with an embodiment, proof generator 1124 generates the cryptographic proof based on a zero-knowledge protocol, such as, but not limited to, Schnorr's protocol. Proof generator 1124 provides the cryptographic proof to orchestrator 104 via a response (e.g., response 1126), which provides the request to proof verifier 1106 of LAP server(s) 104.

Responsive to receiving the response, proof verifier 1106 retrieves the public encryption key(s) associated with the attribute(s) specified by the policy from attribute map 110 and retrieves the encrypted secret share(s) of the user that are associated with the attribute(s) specified by the policy from attribute map 110. Proof verifier 1106 then verifies the cryptographic proof received via the response (e.g., response 1126) based on the public encryption key(s) associated with the attribute(s) specified by the policy and the encrypted secret share(s) retrieved from attribute map 110. In accordance with an embodiment, proof verifier 1106 verifies the cryptographic proof based on a zero-knowledge protocol, such as, but not limited to, Schnorr's protocol. In response to determining that the cryptographic proof is valid, proof verifier 1106 provides a notification 1128 to key manager 302. In response to determining that the cryptographic proof is not valid, proof verifier 1106 does not provide notification 1128 and access to the resource is denied.

In accordance with an embodiment, location verifier 1132 compares the location information provided by application 118 to the location information specified by the policy. If the location information matches, location verifier 1132 determines that the user is at a location at which access to the resource is allowed in accordance with the policy and provides a notification 1130 to key manager 302. Otherwise, notification 1130 is not sent and access to the resource is denied.

In accordance with an embodiment, location verifier 1132 is included in a LAP server of LAP server(s) 104 that is located at the location. For instance, if the location specified by the policy is an aircraft carrier, then location verifier 1132 is included in a LAP server that is located on the aircraft carrier. Although, it is noted that the embodiments described herein are not so limited and that any LAP server of LAP server(s) 104 designated to perform the location verification (either located locally or remotely from the specified location) performs the location verification.

Key manager 302 is configured to provide the decryption key required to decrypt the resource (e.g., decryption key 316) responsive to receiving notifications 1128 and 1130. Key manager 302 returns the decryption key (e.g., decryption key 316) corresponding to the resource to verifier 306 via a response 1140.

In accordance with an embodiment, LAP server(s) 1104 provide decryption key 316 to orchestrator 104, which provides decryption key 316 to decryptor 308 (as shown in FIG. 11). Decryptor 308 decrypts the resource for application 118. In accordance with another embodiment, LAP server(s) 1104 encrypts decryption key 316 using the public encryption key of an entity (e.g., the user (as stored in identity map 108), the user's device (e.g., computing device 102), the user's application (e.g., application 118), a document management and storage system (e.g., Microsoft SharePoint™ published by Microsoft® Corp.) that is to decrypt the resource, etc.). The public encryption key is retrieved from identity map 108. In accordance with such an embodiment, LAP server(s) 104 sends the encrypted decryption key to the entity (e.g., application 118). Decryptor 308 then decrypts the encrypted decryption key using the private encryption key (e.g., private key 310) corresponding to the public encryption key. By doing so, decryption key 316 is protected from rogue users that may intercept communications between LAP server(s) 1104 and computing device 102. In accordance with a further embodiment, LAP server(s) 1104 comprise a decryptor that decrypts the resource, and LAP server(s) 104 provide the decrypted resource to application 118. This way, application 118 is not required to perform the decryption.

Figure 12:
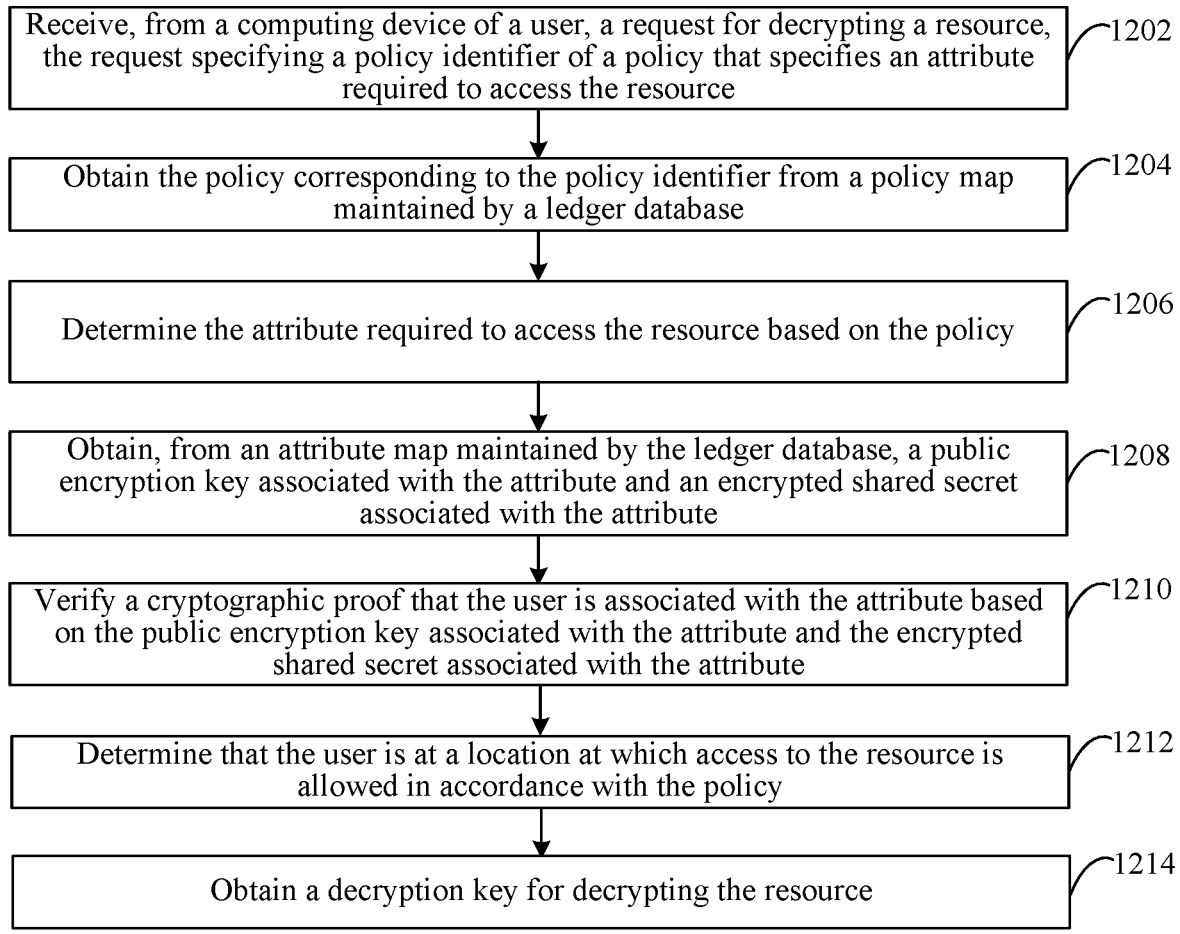
FIG. 12 shows a flowchart for obtaining a decryption key in accordance with another example embodiment.

Accordingly, a decryption key is obtained in many ways. For example, FIG. 12 shows a flowchart 1200 for obtaining a decryption key, according to another example embodiment. In an embodiment, flowchart 1200 is implemented by system 1100, as shown in FIG. 11. Accordingly, flowchart 1200 will be described with continued reference to FIG. 11. Other structural and operational embodiments will be apparent to persons skilled in the relevant art(s) based on the following discussion regarding flowchart 1200 and system 1100 of FIG. 11.

Flowchart 1200 begins with step 1202. In step 1202, a request, from a computing device of a user, is received for decrypting a resource. The request specifies a policy identifier of a policy that specifies an attribute required to access the resource. For example, with reference to FIG. 11, proof requester 1102 receives request 1116 from application 118 of computing device 102 via orchestrator 104 for decrypting a resource stored in data source 106. Request 1116 specifies a policy identifier of a policy that specifies an attribute required to access the resource.

In accordance with one or more embodiments, the attribute comprises at least one of a clearance level of the user, a rank of the user within an organization, or a role of the user within the organization.

In step 1204, the policy corresponding to the policy identifier is obtained from a policy map maintained by a ledger database. For example, with reference to FIG. 11, proof requester 1102 obtains the policy corresponding to the policy identifier from policy map 112 maintained by ledger database 120 (as described above with reference to FIG. 1). For instance, proof requester 1102 provides request 1118 specifying the policy identifier to policy map 112. Policy map 112 looks up the policy using the policy identifier and returns the policy to proof requester 1102 via response 1120.

In step 1206, the attribute required to access the resource is determined based on the policy. For example, with reference to FIG. 11, proof requester 1102 analyzes the policy to determine the attribute required to access the resource.

In step 1208, a public encryption key associated with the attribute and an encrypted shared secret associated with the attribute are obtained from an attribute map maintained by the ledger database. For example, with reference to FIG. 11, proof requester 1102 obtains a public encryption key associated with the attribute and an encrypted shared secret associated with the attribute from attribute map 110 maintained by ledger database 120 (as described above with reference to FIG. 1). The public encryption key associated with the attribute and the encrypted shared secret associated with the attribute obtained from attribute map 110 are associated with the identity of the user.

In step 1210, a cryptographic proof that the user is associated with the attribute is verified based on the public encryption key associated with the attribute and the encrypted shared secret associated with the attribute. For example, with reference to FIG. 11, proof verifier 1106 verifies the cryptographic proof based on the public encryption key associated with the attribute specified by the policy and the encrypted secret share retrieved from attribute map 110. In accordance with an embodiment, proof verifier 1106 verifies the cryptographic proof based on a zero-knowledge protocol, such as, but not limited to, Schnorr's protocol. In response to determining that the cryptographic proof is valid, proof verifier 1106 provides a notification 1128 to key manager 302. In response to determining that the cryptographic proof is not valid, proof verifier 1106 does not provide notification 1128 and access to the resource is denied.

In accordance with one or more embodiments, the cryptographic proof is based on the public encryption key associated with the attribute and an unencrypted version of the encrypted shared secret associated with the attribute.

In accordance with one or more embodiments, verifying the cryptograph proof comprises providing a request for the cryptographic proof to the computing device of the user, and receiving the cryptographic proof from the computing device of the user. For example, with reference to FIG. 11, proof requester 1102 requests application 118 to provide a zero-knowledge cryptographic proof that the user has the proper attributes via a request (e.g., request 1122). The request is received by proof generator 1124 via orchestrator 104. Proof generator 1124 is configured to generate a zero-knowledge cryptographic proof based on public encryption key associated with the attribute specified by the policy and an unencrypted version of shared secrets (shown as shared secret(s) 1138) respectively associated with the attribute. In accordance with an embodiment, proof generator 1124 generates the cryptographic proof based on a zero-knowledge protocol, such as, but not limited to, Schnorr's protocol. Proof generator 1124 provides the cryptographic proof to orchestrator 104 via a response (e.g., response 1126), which provides the request to proof verifier 1106 of LAP server(s) 104.

In step 1212, a determination is made that the user is at a location at which access to the resource is allowed in accordance with the policy. For example, with reference to FIG. 11, location verifier 1132 compares the location information provided by application 118 to the location information specified by the policy. If the location information matches, location verifier 1132 determines that the user is at a location at which access to the resource is allowed in accordance with the policy and provides a notification 1130 to key manager 302. Otherwise, notification 1130 is not sent and access to the resource is denied.

In step 1214, responsive to determining at least that the cryptographic proof is valid and that the user is at the location, a decryption key for decrypting the resource is obtained. For example, with reference to FIG. 11, key manager 302 is configured to provide the decryption key required to decrypt the resource (e.g., decryption key 316) responsive to receiving notifications 1128 and 1130. Key manager 302 returns the decryption key (e.g., decryption key 316) corresponding to the resource to verifier 306 via a response 1140.

In accordance with one or more embodiments, the resource is decrypted utilizing the decryption key, and the decrypted resource is provided to the computing device of the user. For example, with reference to FIG. 11, LAP server(s) 1104 or key manager 302 decrypt the resource utilizing decryption key 316, and the decrypted resource is provided to computing device 102 via orchestrator 104. The foregoing may be performed in a similar manner as described above with reference to FIGS. 5 and 6.

In accordance with one or more embodiments, the decryption key is encrypted using a public encryption key associated with the user and the encrypted decryption key is provided to the computing device of the user. For example, with reference to FIG. 11, LAP server(s) 1104 or key manager 302 encrypt decryption key 316 using a public encryption key associated with the user (e.g., retrieved from identity map 108), and the encrypted decryption key is provided to computing device 102 via orchestrator 104. The foregoing may be performed in a similar manner as described above with reference to FIGS. 7 and 8.

In accordance with one or more embodiments, an identity of the user is verified in accordance with the policy, and responsive to determining that the cryptographic proof is valid, the user is at the location, and the identity of the user is verified, the decryption key is obtained for decrypting the resource. For example, with reference to FIG. 11, to prove the user's identity, proof requester 1102 generates a nonce (e.g., a randomly-generated number intended to prevent replay attacks) and encrypts the nonce using the public encryption key of the user, which proof requester 1102 retrieves from identity map 108 associated with the organization. Proof requester 1102 also maintains a copy of the nonce. Proof requester 1102 provides the encrypted nonce to orchestrator 104, which provides request 1122 to application 118. Decryptor 308 is configured to decrypt the nonce using private encryption key 310 and provides the decrypted nonce to orchestrator 104 via a response 1126, which provides response 1126 to proof verifier 1106. Proof verifier 1106 is configured to compare the decrypted nonce to the locally-stored nonce. If the nonces match, then proof verifier 1106 determines that the user has the proper identity. Otherwise, proof verifier 1106 determines that the user does not have the proper identity and access to the encrypted resource is denied. Decryption key 316 is obtained responsive to verifying the identity, that the identity has the attribute specified by the policy, and that the user is located at the location specified by the policy.

C. Key Provision Via an Untrusted Orchestrator and an Untrusted Key Generator

Figure 13:
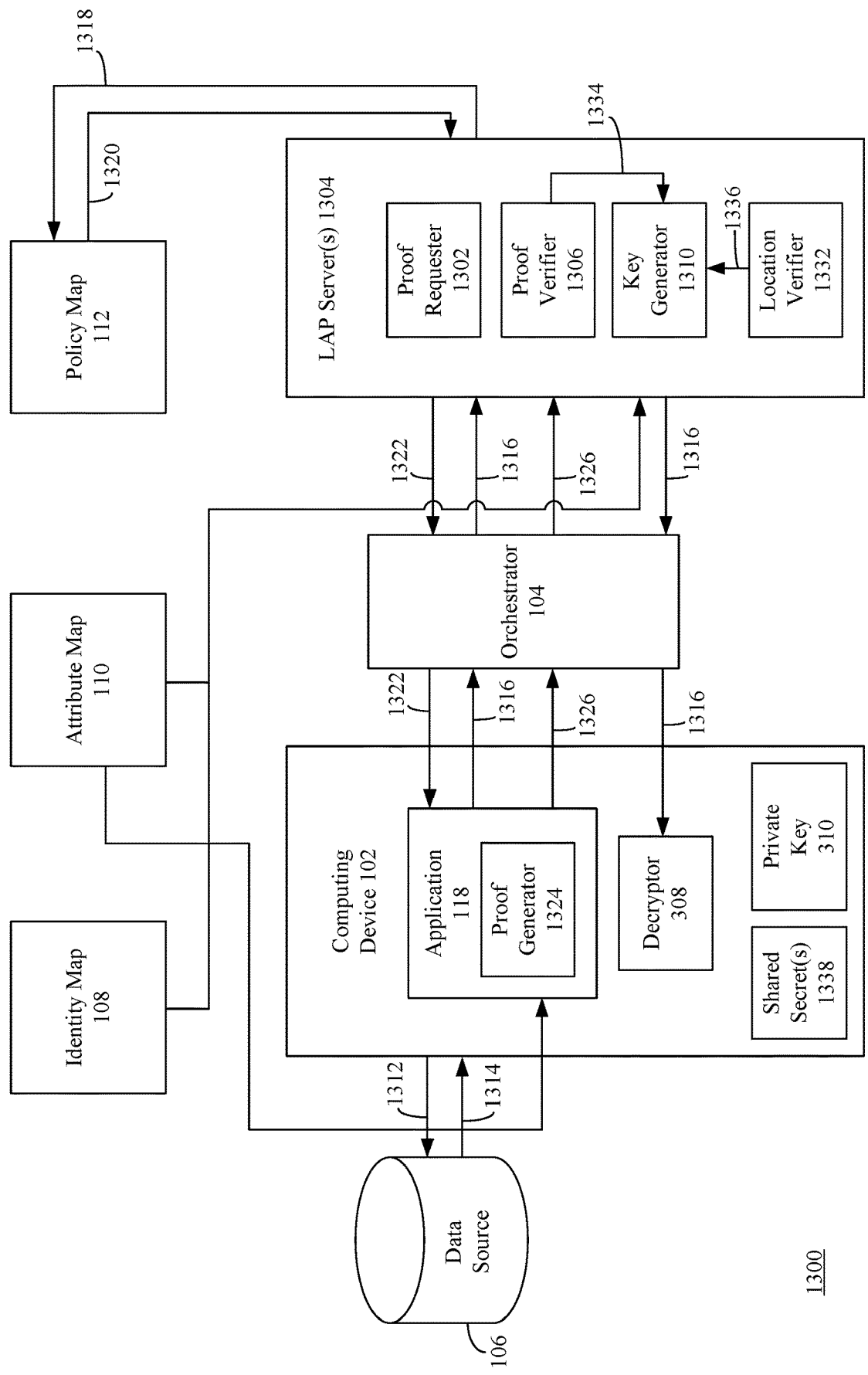
FIG. 13 depicts a block diagram of a system for generating a decryption key in accordance with an example embodiment.

FIG. 13 depicts a block diagram of a system 1300 for generating a decryption key in accordance with an example embodiment. As shown in FIG. 13, system 1300 includes computing device 102, orchestrator 104, data source 106, identity map 108, attribute map 110, policy map 112, key manager 302, and LAP server(s) 1304. LAP server(s) 1304 are examples of LAP server(s) 1104, as described above with reference to FIG. 11. As further shown in FIG. 13, LAP server(s) 1304 comprise a proof requester 1302, a proof verifier 1306, a key generator 1310, and a location verifier 1332. Proof requester 1302, proof verifier 1306, and location verifier 1332 are examples of proof requester 1102, proof verifier 1106, and location verifier 1132, as respectively described above with reference to FIG. 11. Computing device 102 comprises application 118, decryptor 308, private encryption key 310, and shared secret(s) 1338. In accordance with an embodiment, each of proof requester 1302, proof verifier 1306, key generator 1310, and location verifier 1132 are included in a single LAP server of LAP server(s) 1304. In accordance with another embodiment, one or more of proof requester 1302, proof verifier 1306, key generator 1310, and location verifier 1332 are included in a respective LAP server of LAP server(s) 104. In the embodiment described in this Subsection, orchestrator 104 is not trusted to evaluate the policy in this embodiment. As such, orchestrator 104 acts as an intermediary between computing device 102 and LAP server(s) 1104. In addition, proof verifier 1306 and key generator 1310 are also untrusted components.

To request a resource, application 118 provides a request 1312 identifying the resource to data source 106. Data source 106 is configured to return a response 1314 including the encrypted resource and/or specifying at least the policy ID that identifies the policy associated with the requested resource and/or an organization that specifies and/or maintains the policy.

Application 118 provides the policy ID to orchestrator 104 via a request 1316. Orchestrator 104 provides request 1316 to a LAP server of LAP server(s) 104. In accordance with an embodiment, application 118 also provides information that indicates a location at which computing device 102 is located via a request (e.g., request 1316). The information includes, for example, Global Positioning System (GPS) coordinates, an Internet Protocol (IP) address, etc. In accordance with an embodiment, various organizations maintain respective LAP server(s), each configured to determine a policy for resources associated therewith. In accordance with an embodiment, the organization identified via response 1314 is a uniform resource identifier (URI) (e.g., a uniform resource locator (URL)), or an identifier utilized to lookup the URI, at which LAP server(s) of the organization and/or an identity map, attribute map, and/or policy map associated with the organization are located. In accordance with such an embodiment, request 1316 is provided to the LAP server(s) corresponding to the URI thereof.

Proof requester 1302 of LAP server(s) 104 is configured to provide a request 1318 to policy map 112 associated with the organization that specifies the policy ID. Policy map 112 looks up the policy associated with policy ID and returns the policy to proof requester 1302 via a response 1320. Proof requester 1302 analyzes the policy to determine the attribute(s) that are required to access the resource requested by application 118. For instance, the policy specifies an identity at the organization that is allowed to access the resource, specifies that the user requires a first attribute (e.g., the user is required to have a rank level of captain), a second attribute (the user is required to have a top secret security clearance level, and/or location information that specifies that the user must be in a particular location (e.g., aboard a particular submarine) to access the resource.

After determining the attribute(s), proof requester 1302 is configured to determine whether the user has the proper identity and/or attributes. For instance, proof requester 1302 requests application 118 to prove that the user has the proper identity and/or attributes. To prove the user's identity, proof requester 1302 generates a nonce (e.g., a randomly-generated number intended to prevent replay attacks) and encrypts the nonce using the public encryption key of the user, which proof requester 1302 retrieves from identity map 108 associated with the organization. Proof requester 1302 also maintains a copy of the nonce. Proof requester 1302 provides the encrypted nonce to orchestrator 104, which provides request 1322 to application 118.

Decryptor 308 is configured to decrypt the nonce using private encryption key 310 and provides the decrypted nonce to orchestrator 104 via a response 1326, which provides response 1326 to proof verifier 1306.

Proof verifier 1306 is configured to compare the decrypted nonce to the locally-stored nonce. If the nonces match, then proof verifier 1306 determines that the user has the proper identity. Otherwise, proof verifier 1306 determines that the user does not have the proper identity and access to the encrypted resource is denied.

To prove that the user has the proper attributes, proof requester 1302 requests application 118 to provide a zero-knowledge cryptographic proof that the user has the proper attributes via a request (e.g., request 1322). In accordance with the zero-knowledge cryptographic proof, the user (or application thereof (e.g., application 118)) proves to proof verifier 1306 that the user has the proper attributes while the user avoids conveying any additional information apart from the fact that the user has the proper attributes. In accordance with an embodiment, the request is the same request in which the encrypted nonce is provided (e.g., request 1322). In accordance with another embodiment, the request is a different request in which the encrypted nonce is provided.

The request is received by a proof generator 1324 associated with application 118. Proof generator 1324 is configured to generate a zero-knowledge cryptographic proof based on public encryption key(s) respectively associated with the attribute(s) specified by the policy and an unencrypted version of shared secrets (shown as shared secret(s) 1338) respectively associated with the first and second attributes. As shown in FIG. 13, shared secret(s) 1338 are stored locally at computing device 102. As described above, an encrypted version of shared secret(s) 1338 associated with the user and the public encryption key associated with the attributes are stored in attribute map 110. Accordingly, proof generator 1324 retrieves the public encryption key associated with the attributes from attribute map 110. In accordance with an embodiment, proof generator 1324 generates the cryptographic proof based on a zero-knowledge protocol, such as, but not limited to, Schnorr's protocol. Proof generator 1324 provides the cryptographic proof to orchestrator 104 via a response (e.g., response 1326), which provides the request to proof verifier 1306 of LAP server(s) 104.

Responsive to receiving the response, proof verifier 1306 retrieves the public encryption key(s) associated with the attribute(s) specified by the policy from attribute map 110 and retrieves the encrypted secret share(s) of the user that are associated with the attribute(s) specified by the policy from attribute map 110. Proof verifier 1306 then verifies the cryptographic proof received via the response (e.g., response 1326) based on the public encryption key(s) associated with the attribute(s) specified by the policy and the encrypted secret share(s) retrieved from attribute map 110. In accordance with an embodiment, proof verifier 1306 verifies the cryptographic proof based on a zero-knowledge protocol, such as, but not limited to, Schnorr's protocol. In response to determining that the cryptographic proof is valid, proof verifier 1306 provides (or releases) a first portion 1334 of the decryption key to key generator 1310. In accordance with an embodiment, first portion 1334 is a first set of randomly-generated numbers. In response to determining that the cryptographic proof is not valid, proof verifier 1306 does not provide the first portion of the decryption key and access to the resource is denied.

In accordance with an embodiment, location verifier 1332 compares the location information provided by application 118 to the location information specified by the policy. If the location information matches, location verifier 1332 determines that the user is at a location at which access to the resource is allowed in accordance with the policy and provides (or releases) a second portion 1336 of the decryption key to key generator 1310. In accordance with an embodiment, second portion 1336 is a second set of randomly-generated numbers.

In an embodiment in which LAP server(s) 104 are located in the same location (e.g., an aircraft carrier), location verifier 1332 is configured to automatically release second portion 1336 responsive to proof verifier 1306 verifying that the cryptographic proof provided by proof generator 1324 is valid.

Location verifier 1332 provides second portion 1336 to prevent collusion between multiple parties when a policy requires multiple that attributes that no single party has, but multiple parties collude to provide.

In accordance with an embodiment, the LAP server on which location verifier 1332 executes is configured to store second portion 1336. For instance, when an entity encrypts the resource, the entity configures the LAP server to store second portion 1336 and specifies the condition(s) required to release second portion 1336 (e.g., the location at which the user is required to be).

Key generator 1310 is configured to generate (or recover) a decryption key 1316 based on first portion 1334 and second portion 1336. In accordance with an embodiment, key generator 1310 combines first portion 1334 with second portion 1336 to generate decryption key 1316. For example, key generator 1310 may sum first portion 1334 with second portion 1336. In another example, key generator 1310 may perform a polynomial evaluation with respect to first portion 1334 and second portion 1336 to generate decryption key 1316. It is noted that any number of portions of the decryption key may be released and combined to generate decryption key 1316. For example, a portion may be released for each proof that is verified, where a proof is received for each attribute. It is noted that key generator 1310 does not store any decryption keys, as it is an untrusted component.

In accordance with an embodiment, key generator 1310 provides decryption key 1316 to decryptor 308 via orchestrator 104, and decryptor 308 decrypts the resource for application 118. In accordance with another embodiment, key generator 1310 encrypts decryption key 1316 using the public encryption key of an entity (e.g., the user (as stored in identity map 108), the user's device (e.g., computing device 102)), the user's application (e.g., application 118), a document management and storage system (e.g., Microsoft SharePoint™ published by Microsoft® Corp.) that is to decrypt the resource, etc.). The public encryption key is retrieved from identity map 108. In accordance with such an embodiment, key generator 1310 sends the encrypted decryption key to the entity (e.g., application 118) via orchestrator 104. Decryptor 308 then decrypts the encrypted decryption key using the private encryption key (e.g., private key 310) corresponding to the public encryption key. By doing so, decryption key 1316 is protected from rogue users that may intercept communications between LAP server(s) 104 and computing device 102. In accordance with a further embodiment, LAP server(s) 104 comprise a decryptor that decrypts the resource, and LAP server(s) 104 provide the decrypted resource to application 118. This way, application 118 is not required to perform the decryption.

It is noted that proof verifier 1306 is an untrusted component. Thus, if proof verifier 1306 falsely indicates that a cryptographic proof is valid, the decryption key generated by generator 1310 will not be computed correctly, as the user does not have the proper attributes.

Figure 14:
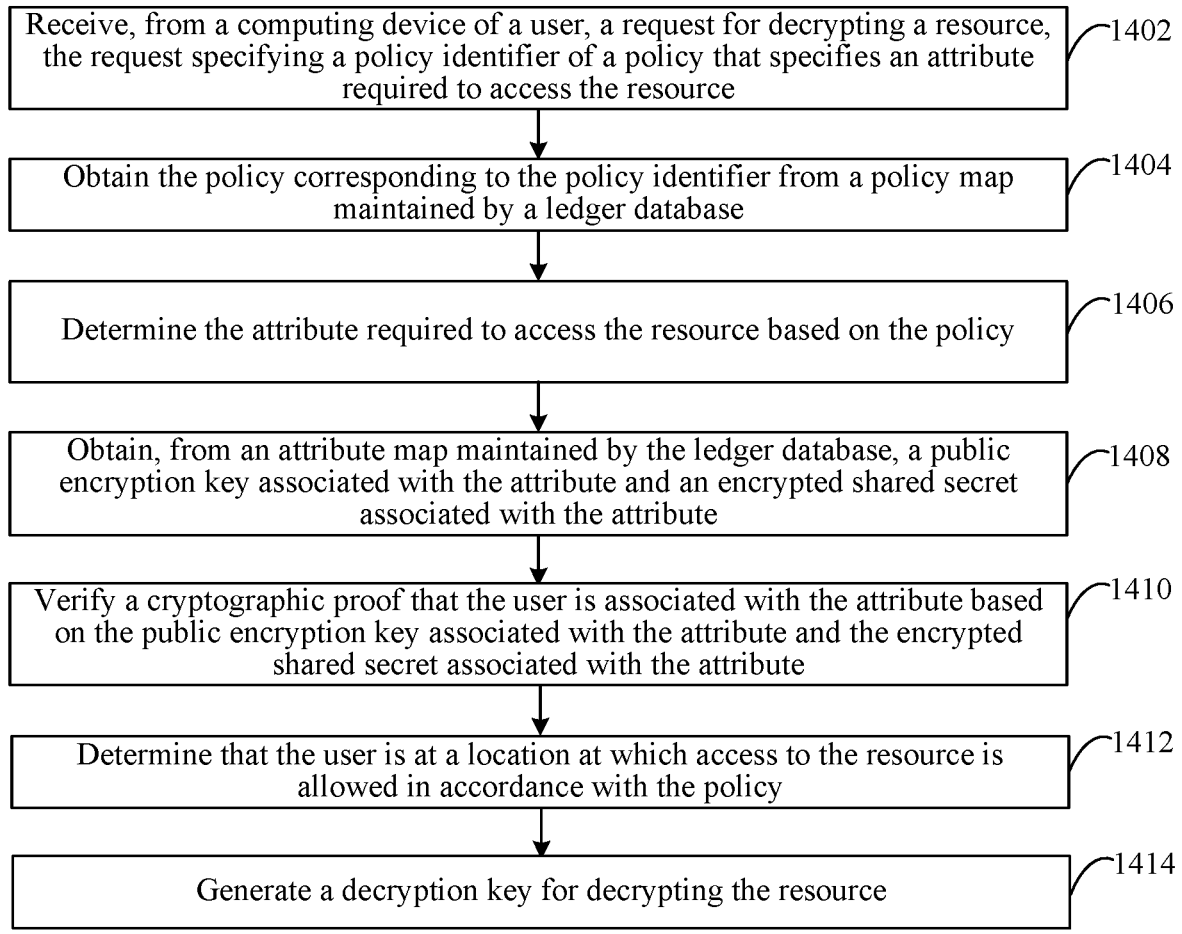
FIG. 14 shows a flowchart for generating a decryption key in accordance with an example embodiment.

Accordingly, a decryption key is generated in many ways. For example, FIG. 14 shows a flowchart 1400 for generating a decryption key, according to an example embodiment. In an embodiment, flowchart 1400 is implemented by system 1300, as shown in FIG. 13. Accordingly, flowchart 1400 will be described with continued reference to FIG. 13. Other structural and operational embodiments will be apparent to persons skilled in the relevant art(s) based on the following discussion regarding flowchart 1400 and system 1300 of FIG. 13.

Flowchart 1400 begins with step 1402. In step 1402, a request, from a computing device of a user, is received for decrypting a resource. The request specifies a policy identifier of a policy that specifies an attribute required to access the resource. For example, with reference to FIG. 13, proof requester 1302 receives request 1316 from application 118 of computing device 102 via orchestrator 104 for decrypting a resource stored in data source 106. Request 1316 specifies a policy identifier of a policy that specifies an attribute required to access the resource.

In accordance with one or more embodiments, the attribute comprises at least one of a clearance level of the user, a rank of the user within an organization, or a role of the user within the organization.

In step 1404, the policy corresponding to the policy identifier is obtained from a policy map maintained by a ledger database. For example, with reference to FIG. 13, proof requester 1302 obtains the policy corresponding to the policy identifier from policy map 112 maintained by ledger database 120 (as described above with reference to FIG. 1). For instance, proof requester 1302 provides request 1318 specifying the policy identifier to policy map 112. Policy map 112 looks up the policy using the policy identifier and returns the policy to proof requester 1302 via response 1320.

In step 1406, the attribute required to access the resource is determined based on the policy. For example, with reference to FIG. 13, proof requester 1302 analyzes the policy to determine the attribute required to access the resource.

In step 1408, a public encryption key associated with the attribute and an encrypted shared secret associated with the attribute are obtained from an attribute map maintained by the ledger database. For example, with reference to FIG. 13, proof requester 1302 obtains a public encryption key associated with the attribute and an encrypted shared secret associated with the attribute from attribute map 110 maintained by ledger database 120 (as described above with reference to FIG. 1). The public encryption key associated with the attribute and the encrypted shared secret associated with the attribute obtained from attribute map 110 are associated with the identity of the user.

In step 1410, a cryptographic proof that the user is associated with the attribute is verified based on the public encryption key associated with the attribute and the encrypted shared secret associated with the attribute. For example, with reference to FIG. 13, proof verifier 1306 verifies the cryptographic proof based on the public encryption key associated with the attribute specified by the policy and the encrypted secret share retrieved from attribute map 110. In accordance with an embodiment, proof verifier 1306 verifies the cryptographic proof based on a zero-knowledge protocol, such as, but not limited to, Schnorr's protocol. In response to determining that the cryptographic proof is valid, proof verifier 1306 provides (or releases) a first portion 1334 of the decryption key to key generator 1310.

In accordance with one or more embodiments, the cryptographic proof is based on the public encryption key associated with the attribute and an unencrypted version of the encrypted shared secret associated with the attribute.

In accordance with one or more embodiments, verifying the cryptograph proof comprises providing a request for the cryptographic proof to the computing device of the user, and receiving the cryptographic proof from the computing device of the user. For example, with reference to FIG. 13, proof requester 1302 requests application 118 to provide a zero-knowledge cryptographic proof that the user has the proper attributes via a request (e.g., request 1322). The request is received by a proof generator 1324 associated with application 118. Proof generator 1324 is configured to generate a zero-knowledge cryptographic proof based on public encryption key associated with the attribute specified by the policy and an unencrypted version of shared secrets (shown as shared secret(s) 1338) respectively associated with the attribute. In accordance with an embodiment, proof generator 1324 generates the cryptographic proof based on a zero-knowledge protocol, such as, but not limited to, Schnorr's protocol. Proof generator 1324 provides the cryptographic proof to orchestrator 104 via a response (e.g., response 1326), which provides the request to proof verifier 1106 of LAP server(s) 104.

In step 1412, a determination is made that the user is at a location at which access to the resource is allowed in accordance with the policy. For example, with reference to FIG. 13, location verifier 1332 compares the location information provided by application 118 to the location information specified by the policy. If the location information matches, location verifier 1332 provides (or releases) second portion 1336 of the decryption key to key generator 1310.

In step 1414, responsive to determining at least that the cryptographic proof is valid and that the user is at the location, a decryption key for decrypting the resource is generated. For example, with reference to FIG. 13, key generator 1310 is configured to generate (or recover) decryption key 1316 based on first portion 1334 and second portion 1336.

In accordance with an embodiment, key generator 1310 combines first portion 1334 with second portion 1336 to generate decryption key 1316. For example, key generator 1310 may sum first portion 1334 with second portion 1336. In another example, key generator 1310 may perform a polynomial evaluation with respect to first portion 1334 and second portion 1336 to generate decryption key 1316.

In accordance with one or more embodiments, the resource is decrypted utilizing the decryption key, and the decrypted resource is provided to the computing device of the user. For example, with reference to FIG. 13, LAP server(s) 1304 decrypt the resource utilizing decryption key 1316, and the decrypted resource is provided to computing device 102 via orchestrator 104. The foregoing may be performed in a similar manner as described above with reference to FIGS. 5 and 6.

In accordance with one or more embodiments, the decryption key is encrypted using a public encryption key associated with the user and the encrypted decryption key is provided to the computing device of the user. For example, with reference to FIG. 13, LAP server(s) 1304 encrypt decryption key 1316 using a public encryption key associated with the user (e.g., retrieved from identity map 108), and the encrypted decryption key is provided to computing device 102 via orchestrator 104. The foregoing may be performed in a similar manner as described above with reference to FIGS. 7 and 8.

In accordance with one or more embodiments, an identity of the user is verified in accordance with the policy, and responsive to determining that the cryptographic proof is valid, the user is at the location, and the identity of the user is verified, the decryption key is generated for decrypting the resource. For example, with reference to FIG. 13, to prove the user's identity, proof requester 1302 generates a nonce (e.g., a randomly-generated number intended to prevent replay attacks) and encrypts the nonce using the public encryption key of the user, which proof requester 1302 retrieves from identity map 108 associated with the organization. Proof requester 1302 also maintains a copy of the nonce. Proof requester 1302 provides the encrypted nonce to orchestrator 104, which provides request 1322 to application 118. Decryptor 308 is configured to decrypt the nonce using private encryption key 310 and provides the decrypted nonce to orchestrator 104 via a response 1326, which provides response 1326 to proof verifier 1306. Proof verifier 1306 is configured to compare the decrypted nonce to the locally-stored nonce. If the nonces match, then proof verifier 1306 determines that the user has the proper identity. Otherwise, proof verifier 1306 determines that the user does not have the proper identity and access to the encrypted resource is denied. Decryption key 1316 is generated responsive to verifying the identity, that the identity has the attribute specified by the policy, and that the user is located at the location specified by the policy.

III. Example Mobile Device and Computer System Implementation

Each of computing device 102, orchestrator 104, data source 106, identity map 108, attribute map 110, policy map 112, DB host(s) 116, application 118, ledger database 120, ledger database 200, ledger 206, blocks 208-214, key manager 302, data retriever 304, verifier 306, decryptor 308, decryptor 606, application 618, encryptor 802, application 818, nonce generator 1002, encryptor 1010, LAP server(s) 1104, proof requester 1102, proof verifier 1106, location verifier 1132, proof generator 1124, LAP server(s) 1304, proof requester 1302, proof verifier 1306, key generator 1310, location verifier 1332, and/or proof generator 1324 and/or each of the steps of flowcharts 400, 500, 700, 900, 1200, and/or 1400 may be implemented in hardware, or hardware combined with software and/or firmware. For example, computing device 102, orchestrator 104, data source 106, identity map 108, attribute map 110, policy map 112, DB host(s) 116, application 118, ledger database 120, ledger database 200, ledger 206, blocks 208-214, key manager 302, data retriever 304, verifier 306, decryptor 308, decryptor 606, application 618, encryptor 802, application 818, nonce generator 1002, encryptor 1010, LAP server(s) 1104, proof requester 1102, proof verifier 1106, location verifier 1132, proof generator 1124, LAP server(s) 1304, proof requester 1302, proof verifier 1306, key generator 1310, location verifier 1332, and/or proof generator 1324 (and/or any of the components thereof) and/or the steps of flowcharts 400, 500, 700, 900, 1200, and/or 1400 may be implemented as computer program code (e.g., instructions in a programming language) configured to be executed in one or more processors and stored in a computer readable storage medium. Alternatively, computing device 102, orchestrator 104, data source 106, identity map 108, attribute map 110, policy map 112, DB host(s) 116, application 118, ledger database 120, ledger database 200, ledger 206, blocks 208-214, key manager 302, data retriever 304, verifier 306, decryptor 308, decryptor 606, application 618, encryptor 802, application 818, nonce generator 1002, encryptor 1010, LAP server(s) 1104, proof requester 1102, proof verifier 1106, location verifier 1132, proof generator 1124, LAP server(s) 1304, proof requester 1302, proof verifier 1306, key generator 1310, location verifier 1332, and/or proof generator 1324 (and/or any of the components thereof) and/or the steps of flowcharts 400, 500, 700, 900, 1200, and/or 1400 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 15:
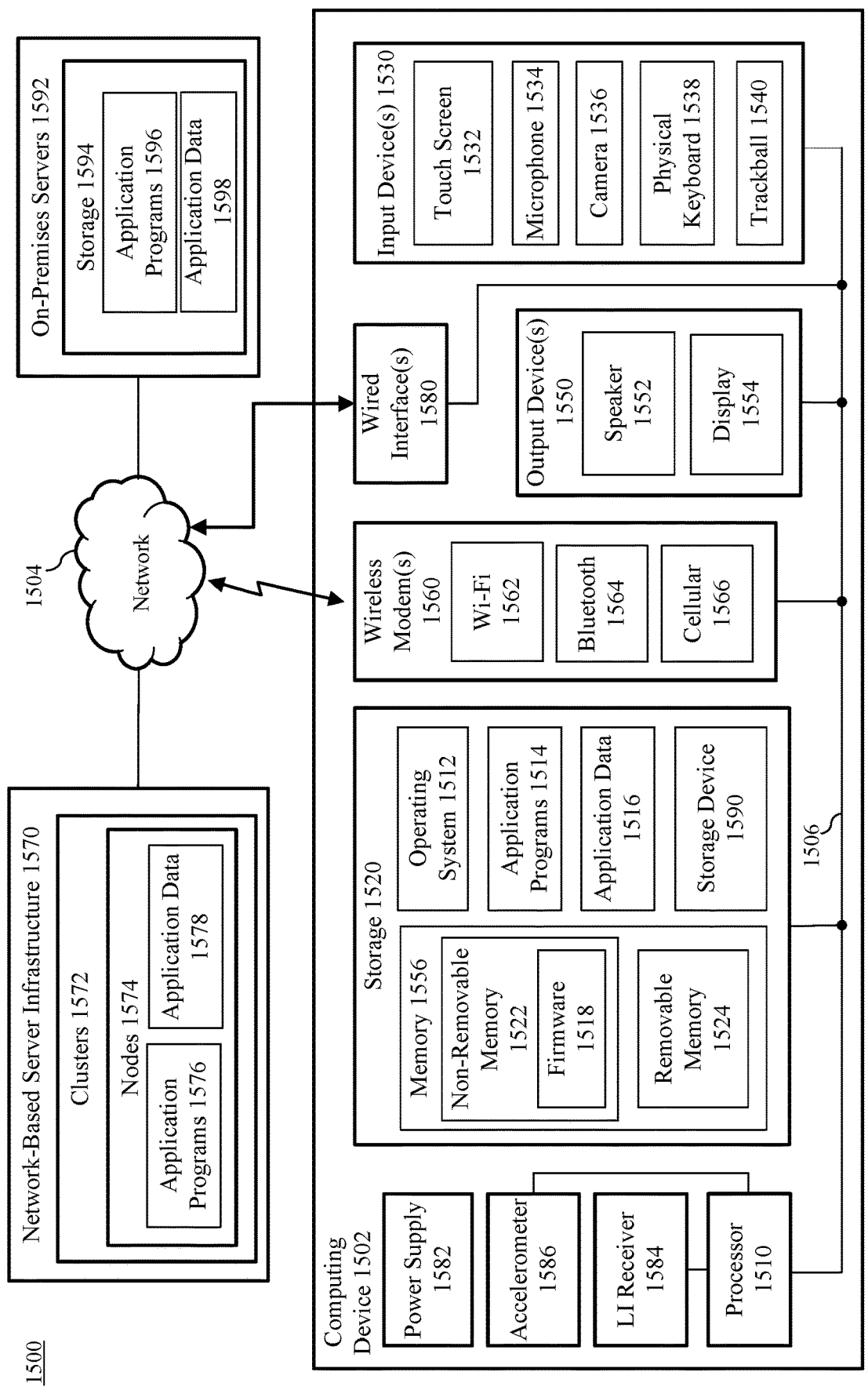
FIG. 15 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 15. FIG. 15 shows a block diagram of an exemplary computing environment 1500 that includes a computing device 1502. In some embodiments, computing device 1502 is communicatively coupled with devices (not shown in FIG. 15) external to computing environment 1500 via network 1504. Network 1504 comprises one or more networks such as local area networks (LANs), wide area networks (WANs), enterprise networks, the Internet, etc., and may include one or more wired and/or wireless portions. Network 1504 may additionally or alternatively include a cellular network for cellular communications. Computing device 1502 is described in detail as follows Computing device 1502 can be any of a variety of types of computing devices. For example, computing device 1502 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1502 may alternatively be a stationary computing device such as a desktop computer, a personal computer (PC), a stationary server device, a minicomputer, a mainframe, a supercomputer, etc.

As shown in FIG. 15, computing device 1502 includes a variety of hardware and software components, including a processor 1510, a storage 1520, one or more input devices 1530, one or more output devices 1550, one or more wireless modems 1560, one or more wired interface(s) 1580, a power supply 1582, a location information (LI) receiver 1584, and an accelerometer 1586. Storage 1520 includes memory 1556, which includes non-removable memory 1522 and removable memory 1524, and a storage device 1590. Storage 1520 also stores an operating system 1512, application programs 1514, and application data 1516. Wireless modem(s) 1560 include a Wi-Fi modem 1562, a Bluetooth modem 1564, and a cellular modem 1566. Output device(s) 1550 includes a speaker 1552 and a display 1554. Input device(s) 1530 includes a touch screen 1532, a microphone 1534, a camera 1536, a physical keyboard 1538, and a trackball 1540. Not all components of computing device 1502 shown in FIG. 15 are present in all embodiments, additional components not shown may be present, and any combination of the components may be present in a particular embodiment. These components of computing device 1502 are described as follows.

A single processor 1510 (e.g., central processing unit (CPU), microcontroller, a microprocessor, signal processor, ASIC (application specific integrated circuit), and/or other physical hardware processor circuit) or multiple processors 1510 may be present in computing device 1502 for performing such tasks as program execution, signal coding, data processing, input/output processing, power control, and/or other functions. Processor 1510 may be a single-core or multi-core processor, and each processor core may be single-threaded or multithreaded (to provide multiple threads of execution concurrently). Processor 1510 is configured to execute program code stored in a computer readable medium, such as program code of operating system 1512 and application programs 1514 stored in storage 1520.

Operating system 1512 controls the allocation and usage of the components of computing device 1502 and provides support for one or more application programs 1514 (also referred to as "applications" or "apps"). Application programs 1514 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1502 can communicate with any other component according to function, although not all connections are shown for ease of illustration. For instance, as shown in FIG. 15, bus 1506 is a multiple signal line communication medium (e.g., conductive traces in silicon, metal traces along a motherboard, wires, etc.) that may be present to communicatively couple processor 1510 to various other components of computing device 1502, although in other embodiments, an alternative bus, further buses, and/or one or more individual signal lines may be present to communicatively couple components. Bus 1506 represents one or more of any of several types of bus structures, including a memory bus or memory controller, a peripheral bus, an accelerated graphics port, and a processor or local bus using any of a variety of bus architectures.

Storage 1520 is physical storage that includes one or both of memory 1556 and storage device 1590, which store operating system 1512, application programs 1514, and application data 1516 according to any distribution. Non-removable memory 1522 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1522 may include main memory and may be separate from or fabricated in a same integrated circuit as processor 1510. As shown in FIG. 15, non-removable memory 1522 stores firmware 1518, which may be present to provide low-level control of hardware. Examples of firmware 1518 include BIOS (Basic Input/Output System, such as on personal computers) and boot firmware (e.g., on smart phones). Removable memory 1524 may be inserted into a receptacle of or otherwise coupled to computing device 1502 and can be removed by a user from computing device 1502. Removable memory 1524 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1590 may be present that are internal and/or external to a housing of computing device 1502 and may or may not be removable. Examples of storage device 1590 include a hard disk drive, a SSD, a thumb drive (e.g., a USB (Universal Serial Bus) flash drive), or other physical storage device.

One or more programs may be stored in storage 1520. Such programs include operating system 1512, one or more application programs 1514, and other program modules and program data. Examples of such application programs may include, for example, computer program logic (e.g., computer program code/instructions) for implementing one or more of, orchestrator 104, DB host(s) 116, application 118, ledger database 120, ledger database 200, ledger 206, blocks 208-214, key manager 302, data retriever 304, verifier 306, decryptor 308, decryptor 606, application 618, encryptor 802, application 818, nonce generator 1002, encryptor 1010, LAP server(s) 1104, proof requester 1102, proof verifier 1106, location verifier 1132, proof generator 1124, LAP server(s) 1304, proof requester 1302, proof verifier 1306, key generator 1310, location verifier 1332, and/or proof generator 1324, along with any components and/or subcomponents thereof, as well as the flowcharts/flow diagrams (e.g., flowcharts 400, 500, 700, 900, 1200, and/or 1400) described herein, including portions thereof, and/or further examples described herein.

Storage 1520 also stores data used and/or generated by operating system 1512 and application programs 1514 as application data 1516. Examples of application data 1516 include web pages, text, images, tables, sound files, video data, and other data, which may also be sent to and/or received from one or more network servers or other devices via one or more wired or wireless networks. Storage 1520 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1502 through one or more input devices 1530 and may receive information from computing device 1502 through one or more output devices 1550. Input device(s) 1530 may include one or more of touch screen 1532, microphone 1534, camera 1536, physical keyboard 1538 and/or trackball 1540 and output device(s) 1550 may include one or more of speaker 1552 and display 1554. Each of input device(s) 1530 and output device(s) 1550 may be integral to computing device 1502 (e.g., built into a housing of computing device 1502) or external to computing device 1502 (e.g., communicatively coupled wired or wirelessly to computing device 1502 via wired interface(s) 1580 and/or wireless modem(s) 1560). Further input devices 1530 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1554 may display information, as well as operating as touch screen 1532 by receiving user commands and/or other information (e.g., by touch, finger gestures, virtual keyboard, etc.) as a user interface. Any number of each type of input device(s) 1530 and output device(s) 1550 may be present, including multiple microphones 1534, multiple cameras 1536, multiple speakers 1552, and/or multiple displays 1554.

One or more wireless modems 1560 can be coupled to antenna(s) (not shown) of computing device 1502 and can support two-way communications between processor 1510 and devices external to computing device 1502 through network 1504, as would be understood to persons skilled in the relevant art(s). Wireless modem 1560 is shown generically and can include a cellular modem 1566 for communicating with one or more cellular networks, such as a GSM network for data and voice communications within a single cellular network, between cellular networks, or between the mobile device and a public switched telephone network (PSTN). Wireless modem 1560 may also or alternatively include other radio-based modem types, such as a Bluetooth modem 1564 (also referred to as a "Bluetooth device") and/or Wi-Fi 1562 modem (also referred to as an "wireless adaptor"). Wi-Fi modem 1562 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1564 is configured to communicate with another Bluetooth-capable device according to the Bluetooth short-range wireless technology standard(s) such as IEEE 802.15.1 and/or managed by the Bluetooth Special Interest Group (SIG).

Computing device 1502 can further include power supply 1582, LI receiver 1584, accelerometer 1586, and/or one or more wired interfaces 1580. Example wired interfaces 1580 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1580 of computing device 1502 provide for wired connections between computing device 1502 and network 1504, or between computing device 1502 and one or more devices/peripherals when such devices/peripherals are external to computing device 1502 (e.g., a pointing device, display 1554, speaker 1552, camera 1536, physical keyboard 1538, etc.). Power supply 1582 is configured to supply power to each of the components of computing device 1502 and may receive power from a battery internal to computing device 1502, and/or from a power cord plugged into a power port of computing device 1502 (e.g., a USB port, an A/C power port). LI receiver 1584 may be used for location determination of computing device 1502 and may include a satellite navigation receiver such as a Global Positioning System (GPS) receiver or may include other type of location determiner configured to determine location of computing device 1502 based on received information (e.g., using cell tower triangulation, etc.). Accelerometer 1586 may be present to determine an orientation of computing device 1502.

Note that the illustrated components of computing device 1502 are not required or all-inclusive, and fewer or greater numbers of components may be present as would be recognized by one skilled in the art. For example, computing device 1502 may also include one or more of a gyroscope, barometer, proximity sensor, ambient light sensor, digital compass, etc. Processor 1510 and memory 1556 may be co-located in a same semiconductor device package, such as being included together in an integrated circuit chip, FPGA, or system-on-chip (SOC), optionally along with further components of computing device 1502.

In embodiments, computing device 1502 is configured to implement any of the above-described features of flowcharts herein. Computer program logic for performing any of the operations, steps, and/or functions described herein may be stored in storage 1520 and executed by processor 1510.

In some embodiments, server infrastructure 1570 may be present in computing environment 1500 and may be communicatively coupled with computing device 1502 via network 1504. Server infrastructure 1570, when present, may be a network-accessible server set (e.g., a cloud-based environment or platform). As shown in FIG. 15, server infrastructure 1570 includes clusters 1572. Each of clusters 1572 may comprise a group of one or more compute nodes and/or a group of one or more storage nodes. For example, as shown in FIG. 15, cluster 1572 includes nodes 1574. Each of nodes 1574 are accessible via network 1504 (e.g., in a "cloud-based" embodiment) to build, deploy, and manage applications and services. Any of nodes 1574 may be a storage node that comprises a plurality of physical storage disks, SSDs, and/or other physical storage devices that are accessible via network 1504 and are configured to store data associated with the applications and services managed by nodes 1574. For example, as shown in FIG. 15, nodes 1574 may store application data 1578.

Each of nodes 1574 may, as a compute node, comprise one or more server computers, server systems, and/or computing devices. For instance, a node 1574 may include one or more of the components of computing device 1502 disclosed herein. Each of nodes 1574 may be configured to execute one or more software applications (or "applications") and/or services and/or manage hardware resources (e.g., processors, memory, etc.), which may be utilized by users (e.g., customers) of the network-accessible server set. For example, as shown in FIG. 15, nodes 1574 may operate application programs 1576. In an implementation, a node of nodes 1574 may operate or comprise one or more virtual machines, with each virtual machine emulating a system architecture (e.g., an operating system), in an isolated manner, upon which applications such as application programs 1576 may be executed.

In an embodiment, one or more of clusters 1572 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1572 may be a datacenter in a distributed collection of datacenters. In embodiments, exemplary computing environment 1500 comprises part of a cloud-based platform such as Amazon Web Services® of Amazon Web Services, Inc. or Google Cloud Platform™ of Google LLC, although these are only examples and are not intended to be limiting.

In an embodiment, computing device 1502 may access application programs 1576 for execution in any manner, such as by a client application and/or a browser at computing device 1502. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1502 may additionally and/or alternatively synchronize copies of application programs 1514 and/or application data 1516 to be stored at network-based server infrastructure 1570 as application programs 1576 and/or application data 1578. For instance, operating system 1512 and/or application programs 1514 may include a file hosting service client, such as Microsoft® OneDrive® by Microsoft Corporation, Amazon Simple Storage Service (Amazon 53)® by Amazon Web Services, Inc., Dropbox® by Dropbox, Inc., Google Drive™ by Google LLC, etc., configured to synchronize applications and/or data stored in storage 1520 at network-based server infrastructure 1570.

In some embodiments, on-premises servers 1592 may be present in computing environment 1500 and may be communicatively coupled with computing device 1502 via network 1504. On-premises servers 1592, when present, are hosted within an organization's infrastructure and, in many cases, physically onsite of a facility of that organization. On-premises servers 1592 are controlled, administered, and maintained by IT (Information Technology) personnel of the organization or an IT partner to the organization. Application data 1598 may be shared by on-premises servers 1592 between computing devices of the organization, including computing device 1502 (when part of an organization) through a local network of the organization, and/or through further networks accessible to the organization (including the Internet). Furthermore, on-premises servers 1592 may serve applications such as application programs 1596 to the computing devices of the organization, including computing device 1502. Accordingly, on-premises servers 1592 may include storage 1594 (which includes one or more physical storage devices such as storage disks and/or SSDs) for storage of application programs 1596 and application data 1598 and may include one or more processors for execution of application programs 1596. Still further, computing device 1502 may be configured to synchronize copies of application programs 1514 and/or application data 1516 for backup storage at on-premises servers 1592 as application programs 1596 and/or application data 1598.

Embodiments described herein may be implemented in one or more of computing device 1502, network-based server infrastructure 1570, and on-premises servers 1592. For example, in some embodiments, computing device 1502 may be used to implement systems, clients, or devices, or components/subcomponents thereof, disclosed elsewhere herein. In other embodiments, a combination of computing device 1502, network-based server infrastructure 1570, and/or on-premises servers 1592 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1520. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1514) may be stored in storage 1520. Such computer programs may also be received via wired interface(s) 1580 and/or wireless modem(s) 1560 over network 1504. Such computer programs, when executed or loaded by an application, enable computing device 1502 to implement features of embodiments discussed herein. Accordingly, such computer programs represent controllers of the computing device 1502.

Embodiments are also directed to computer program products comprising computer code or instructions stored on any computer-readable medium or computer-readable storage medium. Such computer program products include the physical storage of storage 1520 as well as further physical storage types.

IV. Additional Example Embodiments

A system is described herein. The system includes at least one processor; and at least one memory that stores program code that, when executed by the at least one processor, performs operations. The operations comprise: receiving, from a computing device of a user, a request for decrypting a resource, the request specifying a policy identifier of a policy that specifies an attribute required to access the resource; obtaining the policy corresponding to the policy identifier from a policy map maintained by a ledger database; determining the attribute required to access the resource based on the policy; obtaining, from an attribute map maintained by the ledger database, a public encryption key associated with the attribute and an encrypted shared secret associated with the attribute; verifying a cryptographic proof that the user is associated with the attribute based on the public encryption key associated with the attribute and the encrypted shared secret associated with the attribute; determining that the user is at a location at which access to the resource is allowed in accordance with the policy; and responsive to determining at least that the cryptographic proof is valid and that the user is at the location, generating a decryption key for decrypting the resource.

In one implementation of the foregoing system, verifying the cryptographic proof comprises: providing a request for the cryptographic proof to the computing device of the user; and receiving the cryptographic proof from the computing device of the user.

In one implementation of the foregoing system, the attribute comprises at least one of: a clearance level of the user; a rank of the user within an organization; or a role of the user within the organization.

In one implementation of the foregoing system, the operations further comprise: encrypting the decryption key using a public encryption key associated with at least one of the user or the computing device of the user; and providing the encrypted decryption key to the computing device of the user.

In one implementation of the foregoing system, the operations further comprise: decrypting the resource utilizing the decryption key, and providing the decrypted resource to the computing device of the user.

In one implementation of the foregoing system, the operations further comprise: verifying an identity of the user in accordance with the policy; and responsive to determining that the cryptographic proof is valid, the user is at the location, and the identity of the user is verified, generating the decryption key for decrypting the resource.

In one implementation of the foregoing system, the cryptographic proof is based on the public encryption key associated with the attribute and an unencrypted version of the encrypted.

A method is also disclosed herein. The method includes: receiving, from a computing device of a user, a request for decrypting a resource, the request specifying a policy identifier of a policy that specifies an attribute required to access the resource; obtaining the policy corresponding to the policy identifier from a policy map maintained by a ledger database; determining the attribute required to access the resource based on the policy; obtaining, from an attribute map maintained by the ledger database, a public encryption key associated with the attribute and an encrypted shared secret associated with the attribute; verifying a cryptographic proof that the user is associated with the attribute based on the public encryption key associated with the attribute and the encrypted shared secret associated with the attribute; determining that the user is at a location at which access to the resource is allowed in accordance with the policy; and responsive to determining at least that the cryptographic proof is valid and that the user is at the location, obtaining a decryption key for decrypting the resource.

In one implementation of the foregoing method, verifying the cryptographic proof comprises: providing a request for the cryptographic proof to the computing device of the user; and receiving the cryptographic proof from the computing device of the user.

In one implementation of the foregoing method, the attribute comprises at least one of: a clearance level of the user; a rank of the user within an organization; or a role of the user within the organization.

In one implementation of the foregoing method, the method further comprises: encrypting the decryption key using a public encryption key associated with at least one of the user or the computing device of the user; and providing the encrypted decryption key to a computing device associated with the user.

In one implementation of the foregoing method, the method further comprises: decrypting the resource utilizing the decryption key; and providing the decrypted resource to the computing device of the user.

In one implementation of the foregoing method, the method further comprises: verifying an identity of the user in accordance with the policy; and responsive to determining that the cryptographic proof is valid, the user is at the location, and the identity of the user is verified, obtaining the decryption key for decrypting the resource.

In one implementation of the foregoing method, the cryptographic proof is based on the public encryption key associated with the attribute and an unencrypted version of the encrypted shared secret associated with the attribute.

A computer-readable storage medium having program instructions recorded thereon that, when executed by at least one processor, perform a method. The method includes: receiving, from a computing device of a user, a request for decrypting a resource, the request specifying a policy identifier of a policy that specifies an identity authorized to access the resource and a first attribute required to access the resource; obtaining the policy corresponding to the policy identifier from a policy map maintained by a ledger database; determining the identity authorized to access the resource and the first attribute required to access the resource based on the policy; verifying that the user is associated with the identity; responsive to verifying that the user is associated with the identity, obtaining a second attribute of the user from an attribute map maintained by the ledger database; determining that the second attribute is the same as the first attribute; and responsive to determining that second attribute is the same as the first attribute, obtaining a decryption key for decrypting the resource.

In one implementation of the foregoing computer-readable storage medium, verifying the second identity comprises: obtaining a public encryption key associated with the user from an identity map maintained by the ledger database; encrypting a nonce using the public encryption key; providing the encrypted nonce to the computing device of the user; receiving a decrypted nonce from the computing device of the user; determining that the decrypted nonce is the same as the nonce; and responsive to determining that the decrypted nonce is the same as the nonce, verifying that the user is associated with the identity.

In one implementation of the foregoing computer-readable storage medium, the first attribute comprises at least one of: a clearance level of the user; a rank of the user within an organization; or a role of the user within the organization.

In one implementation of the foregoing computer-readable storage medium, the method further comprises: encrypting the decryption key using a public encryption key associated with at least one of the user or the computing device of the user; and providing the encrypted decryption key to the computing device of the user.

In one implementation of the foregoing computer-readable storage medium, the method further comprises: decrypting the resource utilizing the decryption key; and providing the decrypted resource to the computing device of the user.

In one implementation of the foregoing computer-readable storage medium, the resource comprises at least one of: a data file; a database object; structured data; unstructured data; or a data container.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
a processor; and
a memory that stores program code that, when executed by the processor, performs operations, the operations comprising:
receiving, from a computing device of a user, a request for decrypting a resource, the request specifying a policy identifier of a policy that specifies an attribute required to access the resource;
obtaining the policy corresponding to the policy identifier from a policy map;
determining the attribute required to access the resource based on the policy;
obtaining, from an attribute map, a public encryption key associated with the attribute and an encrypted shared secret associated with the attribute;
providing, to the computing device of the user, a request for a cryptographic proof;
receiving the cryptographic proof from the computing device of the user, the cryptographic proof generated based on the public encryption key associated with the attribute and an unencrypted version of the shared secret stored on the computing device of the user;
verifying the cryptographic proof that the user is associated with the attribute based on the public encryption key associated with the attribute and the encrypted shared secret associated with the attribute; and
responsive to determining that the cryptographic proof is valid, generating a decryption key for decrypting the resource.

2. The system of claim 1, wherein the attribute comprises at least one of:
a clearance level of the user;
a rank of the user within an organization; or
a role of the user within the organization.

3. The system of claim 1, the operations further comprising:
encrypting the decryption key using a public encryption key associated with at least one of the user or the computing device of the user; and
providing the encrypted decryption key to the computing device of the user.

4. The system of claim 1, the operations further comprising:
decrypting the resource utilizing the decryption key; and
providing the decrypted resource to the computing device of the user.

5. The system of claim 1, the operations further comprising:
determining that the user is at a location at which access to the resource is allowed in accordance with the policy;
verifying an identity of the user in accordance with the policy; and
responsive to determining that the cryptographic proof is valid, the user is at the location, and the identity of the user is verified, generating the decryption key for decrypting the resource.

6. The system of claim 1, wherein the cryptographic proof comprises:
a zero-knowledge proof.

7. The system of claim 1, wherein the operations further comprise:
providing, to the computing device of the user, a second request for a second cryptographic proof;
receiving the second cryptographic proof from the computing device of the user, the cryptographic proof generated based on the public encryption key associated with a second attribute and an unencrypted version of a second shared secret stored on the computing device of the user; and
verifying the second cryptographic proof that the user is associated with the second attribute based on the public encryption key associated with the second attribute and a second encrypted shared secret associated with the second attribute,
wherein generating the decryption key is further responsive to verifying the second cryptographic proof.

8. A method, comprising:
receiving, from a computing device of a user, a request for decrypting a resource, the request specifying a policy identifier of a policy that specifies an attribute required to access the resource;
obtaining the policy corresponding to the policy identifier from a policy map;
determining the attribute required to access the resource based on the policy;
obtaining, from an attribute map, a public encryption key associated with the attribute and an encrypted shared secret associated with the attribute;
providing, to the computing device of the user, a request for a cryptographic proof; and
receiving the cryptographic proof from the computing device of the user, the cryptographic proof generated based on the public encryption key associated with the attribute and an unencrypted version of the shared secret stored on the computing device of the user;
verifying the cryptographic proof that the user is associated with the attribute based on the public encryption key associated with the attribute and the encrypted shared secret associated with the attribute; and
responsive to determining that the cryptographic proof is valid, obtaining a decryption key for decrypting the resource.

9. The method of claim 8, wherein the attribute comprises at least one of:
a clearance level of the user;
a rank of the user within an organization; or
a role of the user within the organization.

10. The method of claim 8, further comprising:
encrypting the decryption key using a public encryption key associated with at least one of the user or the computing device of the user; and
providing the encrypted decryption key to the computing device of the user.

11. The method of claim 8, further comprising:
decrypting the resource utilizing the decryption key; and
providing the decrypted resource to the computing device of the user.

12. The method of claim 8, further comprising:
determining that the user is at a location at which access to the resource is allowed in accordance with the policy;
verifying an identity of the user in accordance with the policy; and responsive to determining that the cryptographic proof is valid, the user is at the location, and the identity of the user is verified, obtaining the decryption key for decrypting the resource.

13. The method of claim 8, wherein the cryptographic proof comprises:
a zero-knowledge proof.

14. The method of claim 8, further comprising:
providing, to the computing device of the user, a second request for a second cryptographic proof;
receiving the second cryptographic proof from the computing device of the user, the cryptographic proof generated based on the public encryption key associated with a second attribute and an unencrypted version of a second shared secret stored on the computing device of the user; and
verifying the second cryptographic proof that the user is associated with the second attribute based on the public encryption key associated with the second attribute and a second encrypted shared secret associated with the second attribute,
wherein obtaining the decryption key is further responsive to verifying the second cryptographic proof.

15. A computer-readable storage medium having program instructions recorded thereon that, when executed by a processor, perform a method for recovering a decryption key comprising:
receiving, from a computing device of a user, a request for decrypting a resource, the request specifying a policy identifier of a policy that specifies an identity authorized to access the resource and an attribute required to access the resource;
obtaining the policy corresponding to the policy identifier from a policy map;
determining the identity authorized to access the resource and the first attribute required to access the resource based on the policy;
verifying that the user is associated with the identity;
responsive to verifying that the user is associated with the identity, obtaining, from an attribute map, a public encryption key associated with the attribute and an encrypted shared secret associated with the attribute;
providing, to the computing device of the user, a request for a cryptographic proof; and
receiving the cryptographic proof from the computing device of the user, the cryptographic proof generated based on the public encryption key associated with the attribute and an unencrypted version of the shared secret stored on the computing device of the user;
verifying the cryptographic proof that the user is associated with the attribute based on the public encryption key associated with the attribute and the encrypted shared secret associated with the attribute;
responsive to determining that the cryptographic proof is valid, obtaining a decryption key for decrypting the resource.

16. The computer-readable storage medium of claim 15, wherein verifying the second identity comprises:
obtaining a public encryption key associated with the user from an identity map;
encrypting a nonce using the public encryption key;
providing the encrypted nonce to the computing device of the user;
receiving a decrypted nonce from the computing device of the user;
determining that the decrypted nonce is the same as the nonce; and
responsive to determining that the decrypted nonce is the same as the nonce, verifying that the user is associated with the identity.

17. The method of claim 15, wherein the attribute comprises at least one of:
a clearance level of the user;
a rank of the user within an organization; or
a role of the user within the organization.

18. The computer-readable storage medium of claim 15, further comprising:
encrypting the decryption key using a public encryption key associated with at least one of the user or the computing device of the user; and
providing the encrypted decryption key to the computing device of the user.

19. The computer-readable storage medium of claim 15, further comprising:
decrypting the resource utilizing the decryption key; and
providing the decrypted resource to the computing device of the user.

20. The computer-readable storage medium of claim 15, wherein the resource comprises at least one of:
a data file;
a database object;
structured data;
unstructured data; or
a data container.

* * * * *